US 6,661,796 B1

(12) United States Patent
Takashima et al.

(10) Patent No.: US 6,661,796 B1
(45) Date of Patent: *Dec. 9, 2003

(54) CELL MULTIPLEXING APPARATUS HANDLING MULTIPLE ITEMS OF INFORMATION

(75) Inventors: Tomonobu Takashima, Kawasaki (JP); Takeshi Tanaka, Kawasaki (JP); Reiko Norizuki, Kawasaki (JP); Hidetoshi Toyofuku, Kawasaki (JP); Hideki Mase, Kawasaki (JP); Masanori Kajiwara, Tokyo (JP); Kosuke Nobuyasu, Kawasaki (JP); Kenji Tanaka, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/467,759

(22) Filed: Dec. 20, 1999

Related U.S. Application Data

(62) Division of application No. 08/835,995, filed on Apr. 11, 1997, which is a continuation of application No. 08/510,121, filed on Aug. 1, 1995, now abandoned, which is a continuation of application No. 08/004,134, filed on Jan. 13, 1993, now Pat. No. 5,509,007.

(30) Foreign Application Priority Data

Jan. 16, 1992 (JP) .................................................. 4-5378
Jan. 5, 1993 (JP) .................................................. 5-363

(51) Int. Cl.[7] .............................................. H04L 12/56
(52) U.S. Cl. ..................................... 370/395.1; 370/399
(58) Field of Search ................................. 370/389, 434, 370/465, 471, 474, 535, 538, 905, 395.1, 395.3, 398, 399; 379/93.01, 93.08

(56) References Cited

U.S. PATENT DOCUMENTS

| 4,569,042 A | 2/1986 | Larson | 370/60 |
| 4,700,341 A | 10/1987 | Huang | 370/80 |

(List continued on next page.)

FOREIGN PATENT DOCUMENTS

| JP | 61296838 | 12/1986 |
| JP | 63082151 | 4/1988 |
| JP | 1-295546 | 11/1989 |
| JP | 03229544 | 10/1991 |
| JP | 03270488 | 12/1991 |
| JP | 04078248 | 3/1992 |
| JP | 04086145 | 3/1992 |
| JP | 04156193 | 5/1992 |
| JP | 04215344 | 8/1992 |
| JP | 4-287536 | 10/1992 |
| JP | 4-331530 | 11/1992 |
| JP | 5-23643 | 3/1993 |
| JP | 5-211523 | 8/1993 |
| JP | 5-227197 | 9/1993 |

OTHER PUBLICATIONS

U.S. patent application Ser. No. 08/835,995, filed Apr. 11, 1997, Takashima et al., Fujitsu Limited.
"A Study of Multimedia ATM Communication".

Primary Examiner—Alpus H. Hsu
(74) Attorney, Agent, or Firm—Staas & Halsey LLP

(57) ABSTRACT

A cell multiplexing apparatus including call monitors and multiplexers. The call monitors monitor a plurality of channels for their call setting status and select at least two channels for which the same cell may be assembled, i.e., for which the destination of the calls is the same. The multiplexers receive audio information or information already assembled in asynchronous transfer mode (ATM) cells from the channels selected by the call monitors, and disassemble and multiplex the received information for assembly into the payload of a new ATM cell.

14 Claims, 28 Drawing Sheets

U.S. PATENT DOCUMENTS

| | | | |
|---|---|---|---|
| 4,956,839 A | 9/1990 | Torii et al. | 370/60 |
| 4,984,264 A | 1/1991 | Katsube | 370/60 |
| 5,007,045 A | 4/1991 | Tsuzuki | 370/94.1 |
| 5,062,106 A | 10/1991 | Yamazaki et al. | 370/94.1 |
| 5,067,123 A | 11/1991 | Hyodo et al. | 370/60 |
| 5,084,867 A | 1/1992 | Tachibana et al. | 370/60 |
| 5,101,404 A | 3/1992 | Kunimoto et al. | 370/60 |
| 5,119,369 A | 6/1992 | Tanabe et al. | 370/60 |
| 5,130,984 A | 7/1992 | Cisneros | 370/94.1 |
| 5,166,926 A | 11/1992 | Cisneros et al. | 370/60 |
| 5,189,668 A | 2/1993 | Takatori et al. | 370/60 |
| 5,214,642 A | 5/1993 | Kunimoto et al. | 370/94.1 |
| 5,247,516 A | 9/1993 | Bernstein et al. | 370/82 |
| 5,251,209 A | 10/1993 | Jurkevich et al. | 370/82 |
| 5,287,348 A | 2/1994 | Schmidt et al. | |
| 5,291,486 A | 3/1994 | Koyanagi | 370/84 |
| 5,301,184 A | 4/1994 | Uriu et al. | 370/94.1 |
| 5,301,189 A | 4/1994 | Schmidt et al. | |
| 5,311,509 A | 5/1994 | Heddes et al. | |
| 5,313,458 A | 5/1994 | Suzuki | 370/56 |

OTHER PUBLICATIONS

"Voice Transport on an ATM Broadband Network", William Covington et al.; Bell Communications Research, Mar. 1989, IEEE, pp. 1921–1925.

"Synchronous ATM–An analysis of a Call–Packing Algorithm", William J. Spratt; Performance Engineering Group, GEC–Plessey Telecommunications Limited, Sopers Lane, Poole, BH17 7EQ pp. 2/1–2/7.

Hajikano Kazuo et al., "A Study on Connectionless Communication in ATM", Technical Research Report of Electronic Information Communication Meeting SSE90–142 (Mar. 8, 1991).

VIEW ILLUSTRATING OVERALL SYSTEM CONFIGURATION OF SECOND EMBODIMENT OF INVENTION

FIG.26

| CELL No. | DB HEADER | DC HEADER |
|---|---|---|
| CELL 1 | INDICATION OF BEGINNING OF DATA A<br>INDICATION OF BEGINNING OF DATA B<br>INDICATION OF BEGINNING OF DATA C<br>INDICATION OF ABSENCE OF DATA D | LENGTH/SN OF A1 OF DATA A<br>LENGTH/SN OF B1 OF DATA B<br>LENGTH/SN OF C1 OF DATA C |
| CELL 2 | INDICATION OF CONTINUATION OF DATA A<br>INDICATION OF CONTINUATION OF DATA B<br>INDICATION OF CONTINUATION OF DATA C<br>INDICATION OF BEGINNING OF DATA D | LENGTH/SN OF A2 OF DATA A<br>LENGTH/SN OF B2 OF DATA B<br>LENGTH/SN OF C2 OF DATA C<br>LENGTH/SN OF D1 OF DATA D |
| CELL 3 | INDICATION OF CONTINUATION OF DATA A<br>INDICATION OF CONTINUATION OF DATA B<br>INDICATION OF ABSENCE OF DATA C<br>INDICATION OF ABSENCE OF DATA D | LENGTH/SN OF A3 OF DATA A<br>LENGTH/SN OF B3 OF DATA B |
| CELL 4 | INDICATION OF CONTINUATION OF DATA A<br>INDICATION OF ABSENCE OF DATA B<br>INDICATION OF CONTINUATION OF DATA C<br>INDICATION OF CONTINUATION OF DATA D | LENGTH/SN OF A4 OF DATA A<br><br>LENGTH/SN OF C3 OF DATA C<br>LENGTH/SN OF D2 OF DATA D |
| CELL 5 | INDICATION OF ABSENCE OF DATA A<br>INDICATION OF CONTINUATION OF DATA B<br>INDICATION OF CONTINUATION OF DATA C<br>INDICATION OF CONTINUATION OF DATA D | LENGTH/SN OF B4 OF DATA B<br>LENGTH/SN OF C4 OF DATA C<br>LENGTH/SN OF D3 OF DATA D |
| CELL 6 | INDICATION OF CONTINUATION OF DATA A<br>INDICATION OF CONTINUATION OF DATA B<br>INDICATION OF CONTINUATION OF DATA C<br>INDICATION OF ABSENCE OF DATA D | LENGTH/SN OF A5 OF DATA A<br>LENGTH/SN OF B5 OF DATA B<br>LENGTH/SN OF C5 OF DATA C |
| CELL 7 | INDICATION OF END OF DATA A<br>INDICATION OF CONTINUATION OF DATA B<br>INDICATION OF ABSENCE OF DATA C<br>INDICATION OF CONTINUATION OF DATA D | LENGTH/SN OF A6 OF DATA A<br>LENGTH/SN OF B6 OF DATA B<br><br>LENGTH/SN OF D4 OF DATA D |
| CELL 8 | INDICATION OF ABSENCE OF DATA A<br>INDICATION OF CONTINUATION OF DATA B<br>INDICATION OF END OF DATA C<br>INDICATION OF CONTINUATION OF DATA D | LENGTH/SN OF B7 OF DATA B<br>LENGTH/SN OF C6 OF DATA C<br>LENGTH/SN OF D5 OF DATA D |
| CELL 9 | INDICATION OF BEGINNING OF DATA A<br>INDICATION OF END OF DATA B<br>INDICATION OF ABSENCE OF DATA C<br>INDICATION OF CONTINUATION OF DATA D | LENGTH/SN OF A7 OF DATA A<br>LENGTH/SN OF B8 OF DATA B<br><br>LENGTH/SN OF D6 OF DATA D |
| CELL 10 | INDICATION OF CONTINUATION OF DATA A<br>INDICATION OF BEGINNING OF DATA B<br>INDICATION OF ABSENCE OF DATA C<br>INDICATION OF END OF DATA D | LENGTH/SN OF A8 OF DATA A<br>LENGTH/SN OF B9 OF DATA B<br><br>LENGTH/SN OF D7 OF DATA D |

FIG.27

── FIRST FRAME OF DATA A ──

| A1 | A2 | A3 | A4 | A5 | A6 |

SECOND FRAME OF DATA A

| A7 | A8 | |

── FIRST FRAME OF DATA B ──

| B1 | B2 | B3 | B4 | B5 | B6 | B7 | B8 |

SECOND FRAME OF DATA B

| B9 | |

── FIRST FRAME OF DATA C ──

| C1 | C2 | C3 | C4 | C5 | C6 |

── FIRST FRAME OF DATA D ──

| D1 | D2 | D3 | D4 | D5 | D6 | D7 |

| DCF | MEANING |
|---|---|
| 00 | INDICATION OF NON-USE OF APPLICABLE PAYLOAD |
| 01 | INDICATION OF BEGINNING OF APPLICABLE DATA |
| 10 | INDICATION OF CONTINUATION OF APPLICABLE DATA |
| 11 | INDICATION OF END OF APPLICABLE DATA |

| DL | INDICATION OF DATA LENGTH |

| DSN | DATA SEQUENCE Number |

CELL MULTIPLEXING APPARATUS HANDLING MULTIPLE ITEMS OF INFORMATION

This application is a divisional application of application Ser. No. 08/835,995, filed Apr. 11, 1997, now pending which is a continuation of application Ser. No. 08/510,121 filed Aug. 1, 1995, now abandoned, which is a continuation of application Ser. No. 08/004,134, filed Jan. 13, 1993, now U.S. Pat. No. 5,509,007.

BACKGROUND OF THE INVENTION

The present invention relates to an asynchronous transfer mode (ATM) transmission apparatus for multiplexing coded audio signals into a cell for transmission over a transmission network in an ATM mode.

Research is progressing on the so-called ISDN (integrated services digital network). This is a branch of technologies for concurrently transmitting over a single network multiple pieces of information that have different characteristics, such as audio information and dynamic image information. Drawing attention in this area, presently is asynchronous transfer mode (ATM), a switching technique indispensable for implementing a broadened ISDN (B-ISDN). This technique involves dividing communication information into packets called cells of a fixed length for transmission.

The most commonly utilized method today for coding telephone voice signals in digital format is pulse code modulation (PCM) at a transmission rate of 64 kilobits per second. Where it is desired to lower the transmission rate (also known as the bit rate) without degrading the quality of voice transmitted, one known method employed is ADPCM (adaptive differential pulse code modulation) at a transmission rate of 32 kilobits per second.

About to be put into practice is what is known as low delay code excited linear prediction (LD-CELP:CCITT G728). This is a method for converting every five values sampled at 8 kHz into a predetermined code of 10 bits, whereby a transmission rate of 16 kilobits per second is provided.

Where voice signals are transmitted as communication information, the quality of voice sound deteriorates if the transmission delay time involved is prolonged. Thus there are strict limits as to how long the transmission delay time is allowed to be.

Described below is a typical setup of the above-mentioned ATM transmission using voice signals. FIG. 2 is a block diagram of a typical prior art ATM transmission apparatus, and FIG. 3 is a view showing the constitution of an ATM cell used by the conventional apparatus of FIG. 2. In FIG. 2, an exchange 1 accommodates subscriber lines from a plurality of subscriber terminals 2 and is connected to the ATM transmission apparatus 4 via a plurality of channels 5.

Suppose that one of the subscriber terminals 2 (i.e., calling subscriber) makes a call to communicate with another subscriber terminal (i.e., called subscriber) via an ATM transmission line 3. In that case, the exchange 1 first connects the terminal 2 of the calling subscriber to the ATM transmission apparatus 4 over a given channel 5.

In turn, the ATM transmission apparatus 4 converts into a predetermined digital code (called coded information) the voice signal transmitted from the subscriber terminal 2 (calling subscriber) through the exchange 1 and channel 5. The ATM transmission apparatus 4 then generates an ATM cell 10, multiplexes it with another cell made of the voice signal from the subscriber terminal 2, and transmits the multiplexed result over the ATM transmission line 3.

As depicted in FIG. 3, cells generated by the ATM transmission apparatus 4 are each composed of 53 octets. The first five octets constitute an ATM header 7. The ATM header 7 includes a virtual path identifier (VPI) and a virtual channel identifier (VCI). The remaining 48 octets make up a payload 8 comprising coded information.

Of the 48 octets constituting the payload, the first octet contains a sequence number identifier (SN) and a data type identifier (IT), the last two octets make up an effective data length identifier (LI) and a cyclic redundancy check identifier (CRC). The remaining 45 octets (i.e., 360 bits) constitute a payload user information part 11 for transmitting the coded information.

The ATM transmission apparatus 4 of FIG. 2 is equipped for each channel 5 with a coder-decoder 41, a code buffer 42, a payload assembler 43 and an ATM multiplexer 13. The channels 5 are provided commonly with a cross connection multiplexer 45. These components work as follows:

The coder-decoder 41 digitizes a voice signal illustratively according to the LD-CELP method. The voice signal has been transmitted from a subscriber terminal 2 (calling subscriber) over a channel 5 and through the exchange 1. The signal in digital format is stored in the code buffer 42 downstream.

The payload assembler 43 monitors the amount of coded information in the code buffer 42. On detecting an accumulation of 36 items of coded information (i.e., 360 bits, or 45 octets) in the code buffer 42, the payload assembler 43 gets the accumulated 36 items of coded information from the code buffer 42 and assembles them into a payload 8. The payload 8 is then transferred to the ATM multiplexer 13 downstream.

Upon receipt of the payload 8 from the payload assembler 43, the ATM multiplexer 13 composes a cell by adding an ATM header 7 to the payload coming from the payload assembler 43. The cell when composed is transferred to the cross connection multiplexer 45.

The cross connection multiplexer 45 stores temporarily in a queue (i.e., buffer) the cells transferred from the ATM multiplexers 13 upstream. The cells are then output onto the ATM transmission line 3 in the order in which they were stored into the buffer.

As described, in the prior art ATM transmission apparatus 4, the coded information made of the voice signals coming from subscriber terminals 2 is transmitted over the ATM transmission line 3 after 36 items of the coded information are accumulated in the code buffer 42 and are assembled into a cell for transmission.

It takes 625 microseconds (Ns) for the coder-decoder 41 to generate one item of coded information (i.e., 125 Nd××5). That is, a delay time of 22,500 Ns occurs by the time 36 items of coded information are accumulated in the code buffer 42 (i.e., 625 Ns×36). This often makes it difficult to comply with the time constraints on transmission delay under the LD-CELP method. As a result, a serious adverse effect on the quality of the transmitted voice may occur.

Presently, there is a possibility that in-house LAN's (local area networks), based on the DQDB (distributed queue dual bus) system proposed under IEEE (Institute of Electrical and Electronics Engineers) 802.6, will gain widespread acceptance. If that happens, the congestion of different types of communication information, which will affect transmission, can be a severe disadvantage to the system.

Packet data transmitted over the LAN's have variable lengths while ATM cells 10 have a fixed length. When communication information is divided, the divided items are multiplexed into an ATM cell 10. If a fraction of the cell 10 constitutes the information, the remaining vacant parts are filled with dummy patterns so that the finished cell will be a complete cell. The smaller the fraction and the higher the frequency at which a fractionally complete cell occurs, the more dummy patterns are needed to fill the gap. As a result, the transmission efficiency decreases.

More and more terminals connected to in-house LAN's including those in compliance with the DQDB system will likely be multi-media terminals such as TV telephone sets and audio/visual output devices. There is little doubt that the number of available channels will not keep up with the growing number of multi-media terminals. Furthermore, if equipped with a transmitter-receiver for each different medium, the multi-media terminal will bloat in size and cost and will run counter to today's trend toward downsized terminals with compact functions.

Certain kinds of communication information such as motion pictures require synchronism between dynamic image information and audio information when transmitted. Ensuring synchronism between the different kinds of information is necessary so as to keep the received information meaningful. It may be arranged technically that each cell comprises either audio or image information alone. In that case, a relatively small amount of audio information is in disproportionate contrast with large quantities of dynamic image information. This can result in what is known as image cell drop-out, i.e., the rate of dynamic image information transmission failing to keep up with the rate of audio information transmission. The image cell drop-out can be a major cause of deterioration in image quality.

SUMMARY OF THE INVENTION

It is therefore an object of the present invention to provide a cell multiplexing apparatus operating in asynchronous transfer mode (ATM), the apparatus minimizing the delay time required to transmit communication information of a single or a plurality of kinds over an ATM transmission network while collectively handling communication information of different media with no data drop-out.

In carrying out the invention and according to one aspect thereof, there is provided a cell multiplexing apparatus which receives communication information over at least two channels of any one of the same and different kinds, and assembles the received information into an asynchronous transfer mode cell made of a fixed-length header and a payload, and which transmits the assembled cell. The apparatus comprises call monitoring means for obtaining call setting information from individual items of the communication information and multiplexing means for multiplexing the communication information received over the minimum of two channels into a single asynchronous transfer mode cell of a fixed length in accordance with the call setting information obtained by the call monitoring means.

In a preferred structure according to the invention, the multiplexing means 200 may multiplex control and alarm information from the channels 5 selected by the call monitoring means together with, say, audio information into a cell. Alternatively, the multiplexing means 200 may assemble a cell using audio signals obtained by converting a plurality of sampled values into a code of a predetermined number of bits. Because the communication information 6 from the multiple channels 5 is multiplexed, as described, into a single cell according to the invention, the transfer delay is minimized.

When a plurality of items of information are multiplexed into a single cell, the payload part of the cell may be formed to a fixed or variable length. How the payload part is formed may be expressed as payload control information that is prefixed to the beginning of the payload 8.

The same kind of communication information (e.g., audio information) may be multiplexed into a single cell. Alternatively, communication information of different characteristics (audio and image information) may be multiplexed into a single cell.

In a further preferred structure according to the invention, a plurality of ATM cells 10 received as communication information 6 may be divided and the divided parts may be multiplexed into a new ATM cell 10.

These and other objects, features and advantages of the invention will become more apparent upon a reading of the following description and appended drawings.

BRIEF DESCRIPTION OF THE DRAWINGS

FIG. 26 is a view showing typical contents of payload control information parts in ATM cells in connection with the fifth embodiment;

FIG. 27 is a view describing how the ATM cells multiplexed by the fifth embodiment as shown in FIG. 25 are restored back to the original information;

DESCRIPTION OF THE PREFERRED EMBODIMENTS

Figure 1:
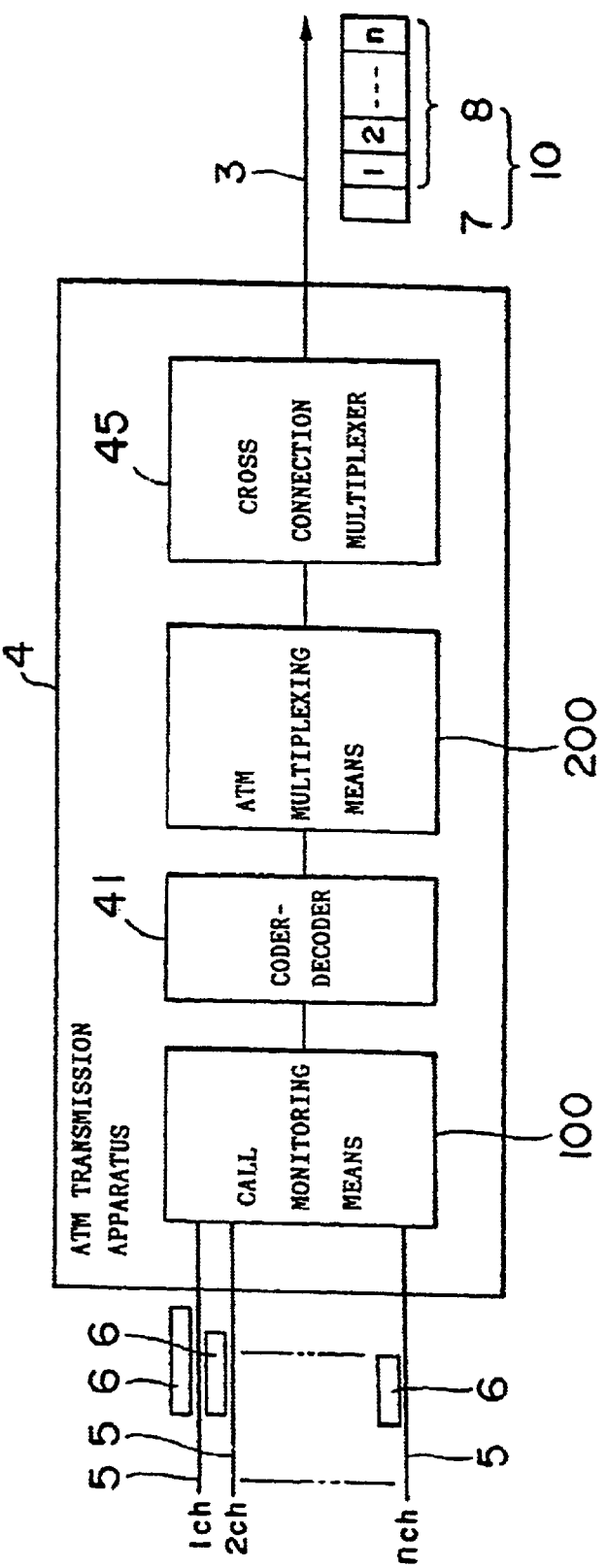
FIG. 1 is a view illustrating the operating principle of the present invention.
Figure 2:
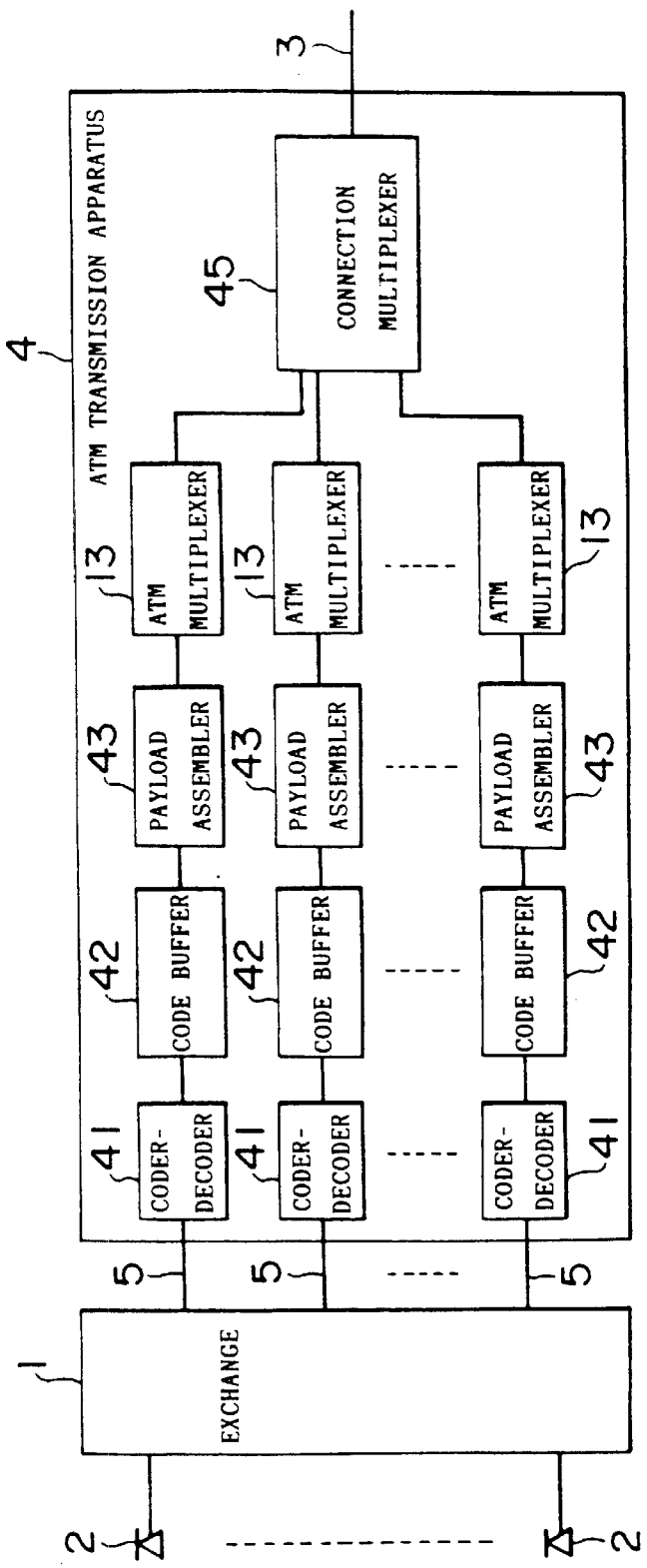
FIG. 2 is a block diagram of a typical prior art ATM transmission apparatus.
Figure 3:
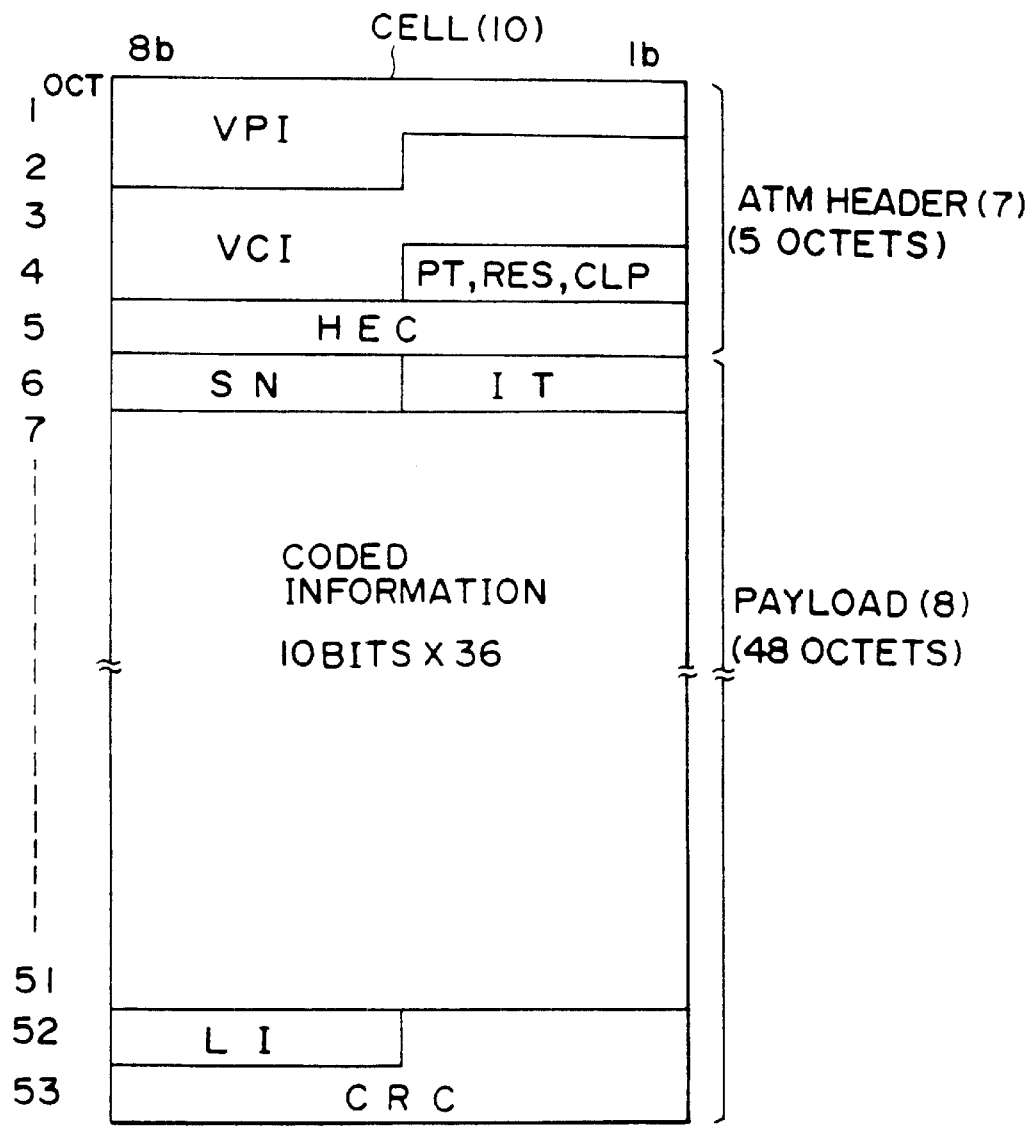
FIG. 3 is a view showing the constitution of an ATM cell used by the conventional apparatus of FIG. 2.

In FIG. 1, call monitoring means 100 monitors each of the multiple channels 5 for the call setting status in order to select a plurality of channels 5 for which the same cell may be assembled (i.e., for the same destination). The coder-decoder 41 for each channel 5 converts to coded information the audio signal transmitted over the corresponding channel 5. Cell multiplexing means 200 takes audio information or ATM cells from the multiple channels 5 selected by the call monitoring means 100, through the coder-decoder 41, divides the received information or ATM cells, and assembles the divided parts in a multiplexing manner into a new cell (containing a payload 8). The cross connection multiplexer 45 places in a queue the cells coming from the multiplexing means 200.

First Embodiment

Figure 4:
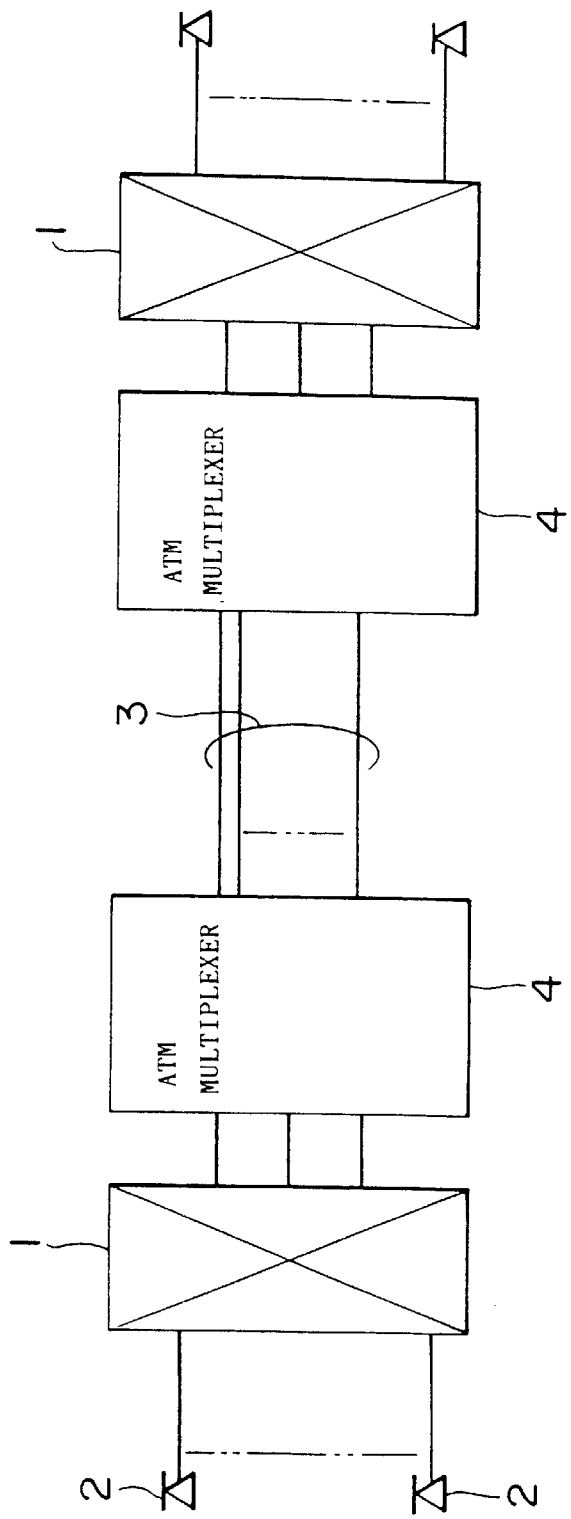
FIG. 4 is a block diagram depicting the overall system configuration of a first embodiment of the invention.

The first embodiment of the invention is arranged to divide audio information from a plurality of channels into ATM cells 10 of a fixed length each for multiplexing. FIG. 4 depicts the overall system configuration of the first embodiment, FIG. 5 is a block diagram of an ATM transmission apparatus according to the first embodiment, and FIG. 6 shows the format of an ATM cell used by the first embodiment.

Figure 7:
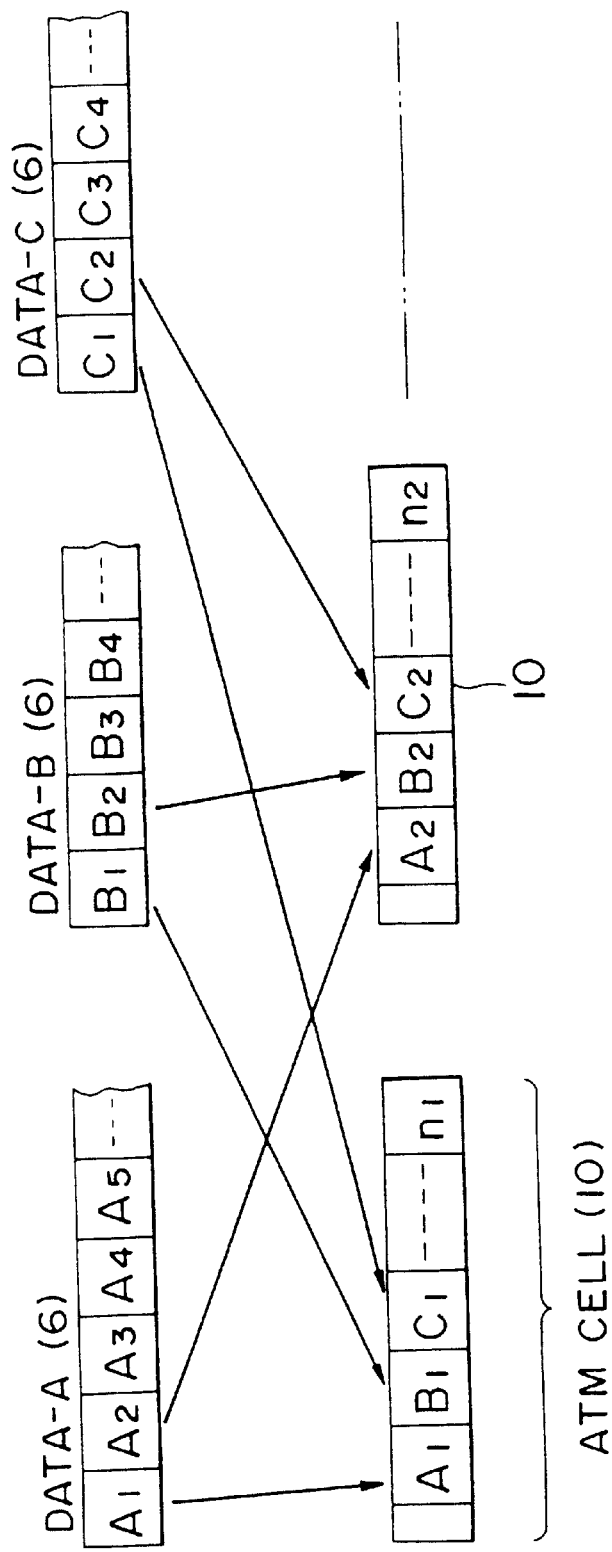
FIG. 7 is a conceptual view indicating how data items are multiplexed by the first embodiment.

FIG. 7 is a conceptual view indicating how data items are multiplexed by the first embodiment. FIG. 7 shows how audio information from a plurality of channels 5 (data A, data B, data C, . . . ) is multiplexed into ATM cells 10.

In FIG. 4, an exchange 1 accommodating subscriber lines from subscriber terminals 2 is connected to an ATM transmission apparatus 4. The ATM transmission apparatus 4 on the calling side is in turn connected via an ATM transmission line 3 to another ATM transmission apparatus 4 on the called side.

Figure 5:
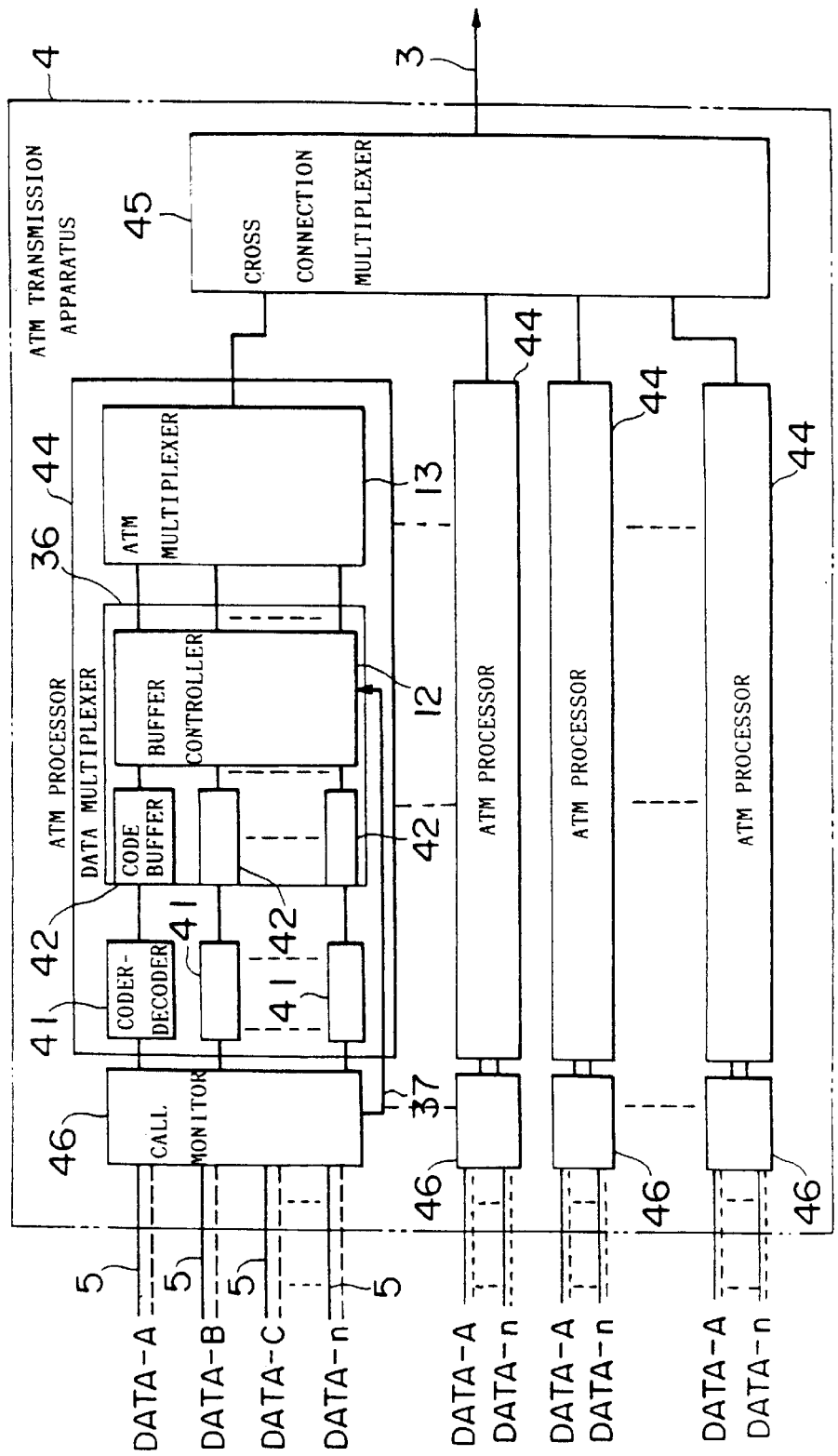
FIG. 5 is a block diagram of an ATM transmission apparatus in the first embodiment.
Figure 6:
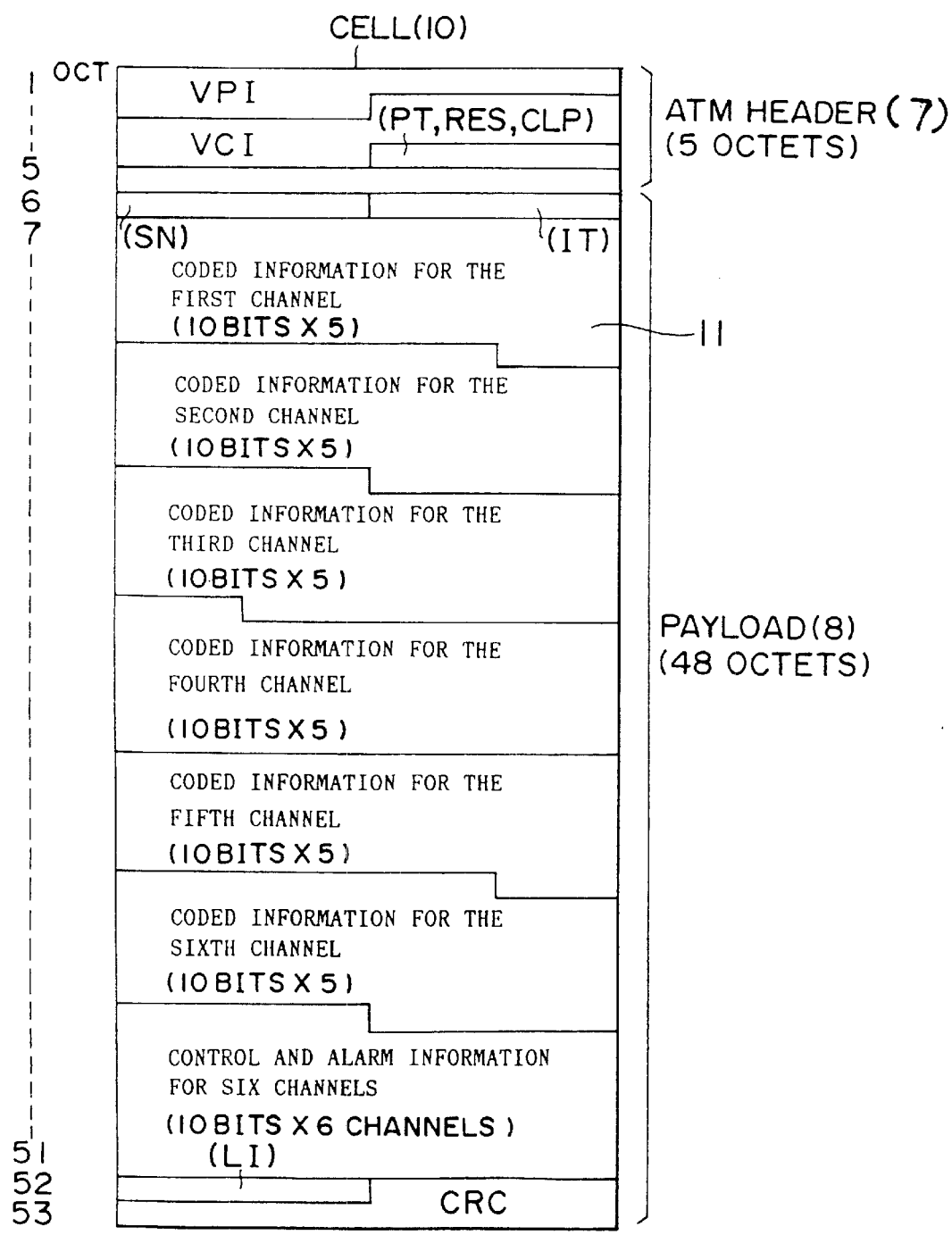
FIG. 6 is a view showing the format of an ATM cell used by the first embodiment.

In FIG. 5, call monitors 46 constituting call monitoring means 10 are provided in the ATM transmission apparatus 4. The call monitors 46 respectively connected to ATM processors 44. Each ATM processor 44 comprises coder-decoder 41, a data multiplexer 36 and an ATM multiplexer 13, the latter two constituting multiplexing means 200.

Referring again to FIG. 4, suppose that a subscriber (calling subscriber) wishes to make a call to another subscriber (called subscriber). In that case, the exchange 1 connects the calling subscriber's terminal 2 to the ATM transmission apparatus 4 via a given channel 5. In FIG. 5, the calling subscriber sends to the ATM transmission apparatus 4 call setting information for setting up the call.

In the ATM transmission apparatus 4, the call monitor 46 monitors the call setting information coming from the calling subscribers over the channels (data A–n). From the call setting information, each call monitor 46 obtains the settings needed to determine a virtual path identifier VPI and a virtual channel identifier VCI for the relevant ATM processor 44. The settings are transferred along with identification information of each channel 5 to the data multiplexer 36. The transfer is made to a buffer controller 12 (buffer control means 12) in the data multiplexer 36 via a control line 37 provided independently of the data communication lines.

Figure 8:
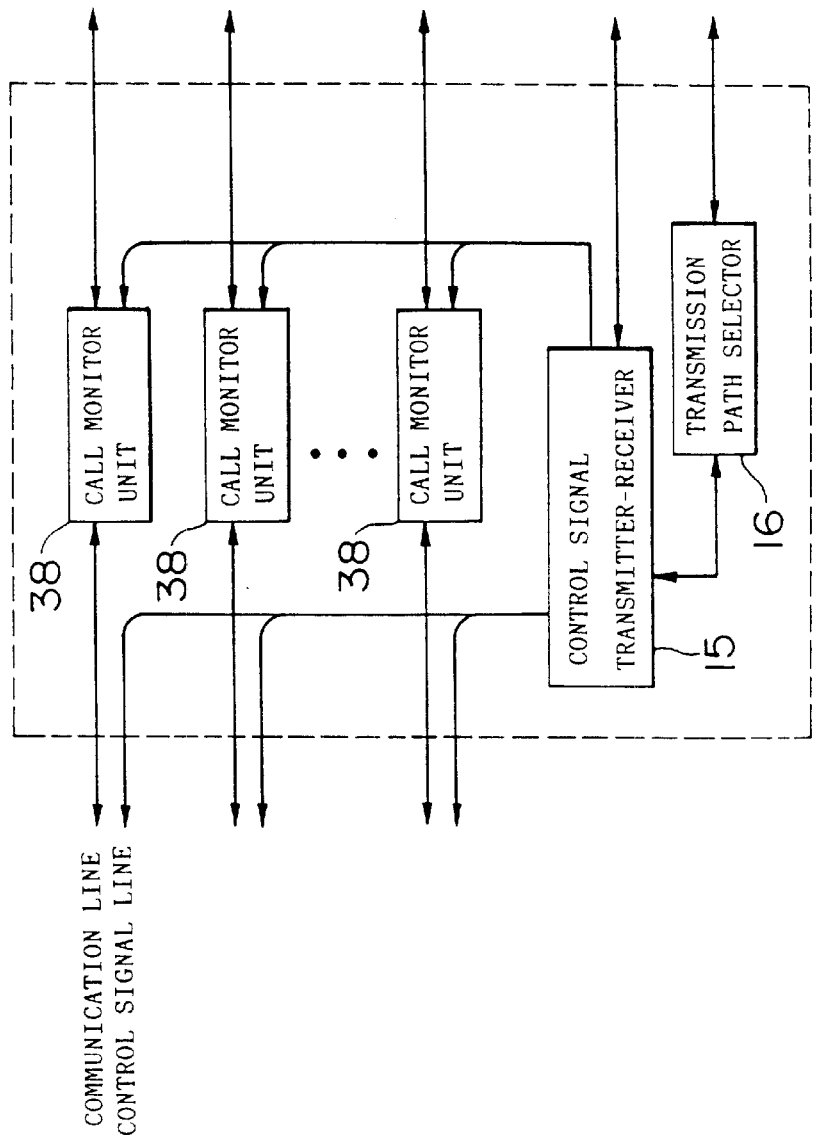
FIG. 8 is a detailed view showing how call monitors are illustratively structured in the first embodiment.

How each call monitor is typically structured will now be described with reference to FIG. 8. As shown in FIG. 8, each call monitor comprises call monitor units 38 provided for the respective channels, a control signal transmitter-receiver 15 for recognizing a channel control signal received over the channels 5, and a transmission path selector 16 for obtaining path information from the channel control signal.

The control information including the channel control information may be obtained on an in-slot basis (i.e., the information is contained in the audio signal from the channels 5), or on an out-slot basis (the information is received over a separate control line 37 independent of the audio information).

In the data multiplexer 36 of FIG. 5, the buffer controller 12 analyzes the information sent from the call monitor 46, determines the virtual path identifier VPI and virtual channel identifier VCI for identifying the call, selects up to six channels 5 that determined the identifiers VPI and VCI, and forms a group of communication data accordingly. This group of communication data is a group which comprises communication information received over different channels 5 and which complies with the virtual path identifier VPI and virtual channel identifier VCI of the next stage.

When the calling subscriber starts transmitting communication information (audio signal in this example), the coder-decoder 41 provided for each channel 5 converts to coded information the audio signal transmitted over the corresponding channel 5 and through the exchange 1. The conversion is carried out on the basis of the LD-CELP method. The coded information is accumulated in the code buffer 42 of the data multiplexer 36.

The buffer controller 12 monitors the amount of coded information being accumulated in each code buffer 42. A point is eventually reached where the buffer controller 12 finds that the code buffers 42 corresponding to the six channels 5 forming the same group have each accumulated five sets of coded information (a total of 50 bits). At that point, the buffer controller 12 obtains the accumulated five sets of coded information from the buffers and stores them into a user information part 11 of each channel 5 in the payload 8 of the cell shown in FIG. 6.

In addition, the buffer controller 12 collects through the call monitor 46 the control information on the connection status of six subscribers forming the same group (e.g., on-hook/off-hook information) as well as alarm information in connection therewith. The collected information is stored in a 10-bit control/alarm information area assigned to the six channels 5 in the payload 8.

Five sets of coded information (a total of 50 bits) and control/alarm information (10 bits) are allocated to each of the six channels 5. These sets of coded information constitute part of the 360-bit payload 8.

Figure 25:
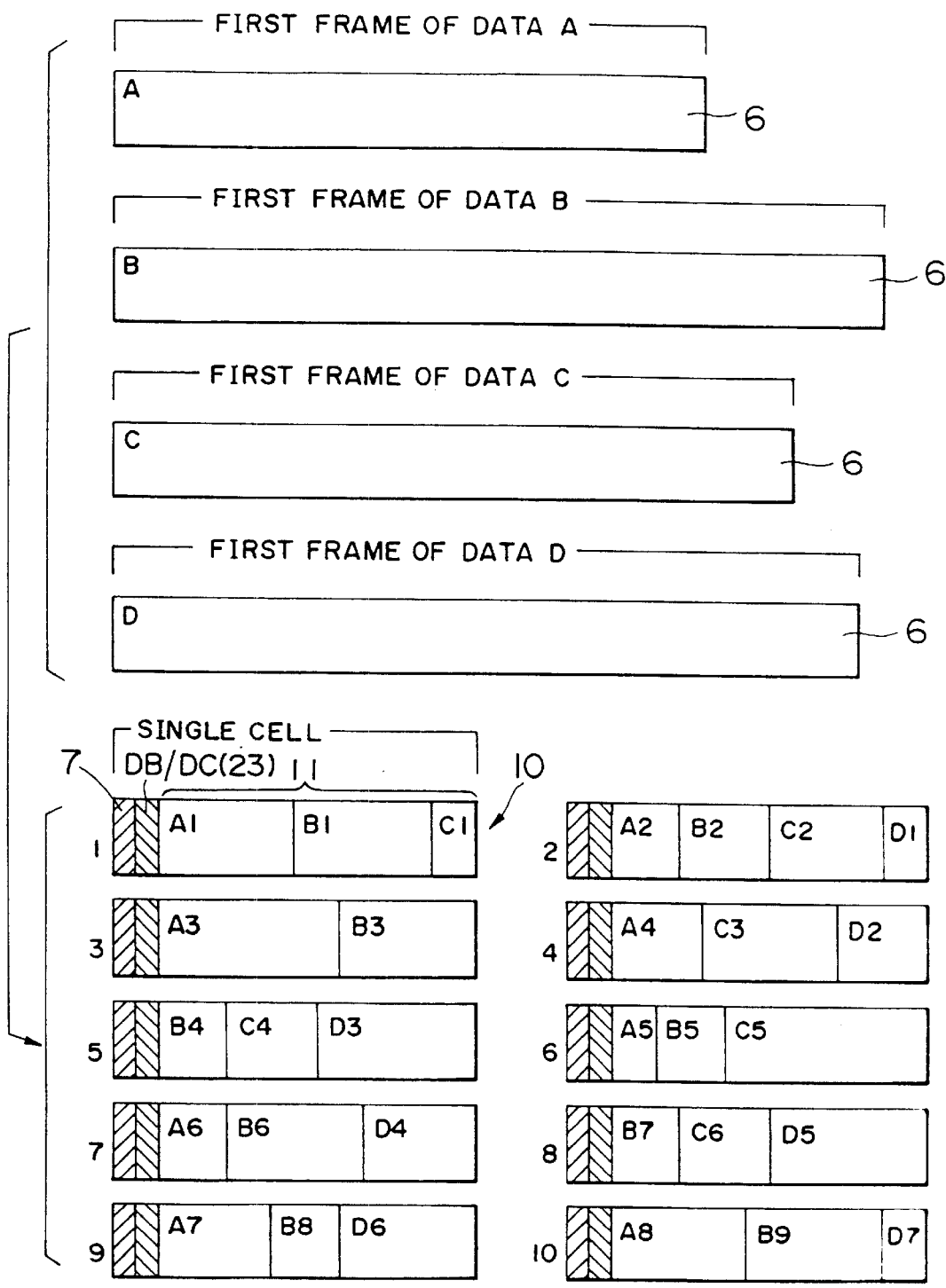
FIG. 25 is a conceptual view illustrating how ATM cells are multiplexed by the fifth embodiment.

In the setup of FIG. 6, each coded information area of the payload 8 is formed to a fixed length (50 bits). Alternatively, these information areas may be formed to a variable length each. How this can be achieved will be described later in connection with the fifth embodiment (FIG. 25).

The payload 8 is assembled under control of the buffer controller 12. The payload data are then output to the ATM multiplexer 13 in accordance with the virtual path identifier VPI and virtual channel identifier VCI determined commonly for those channels 5 constituting the same group.

The ATM multiplexer 13 assembles a cell by supplementing the payload 8 from the upstream multiplexing part with an ATM header 7 containing the virtual path identifier VPI and virtual channel identifier VCI. The assembled cell is transmitted to a cross connection multiplexer 45. The cross connection multiplexer 45 places in a queue (i.e., buffer) the cells coming from various ATM multiplexers 13. These cells are then output over the ATM transmission line 3 in the order in which they arrived.

Figure 9:
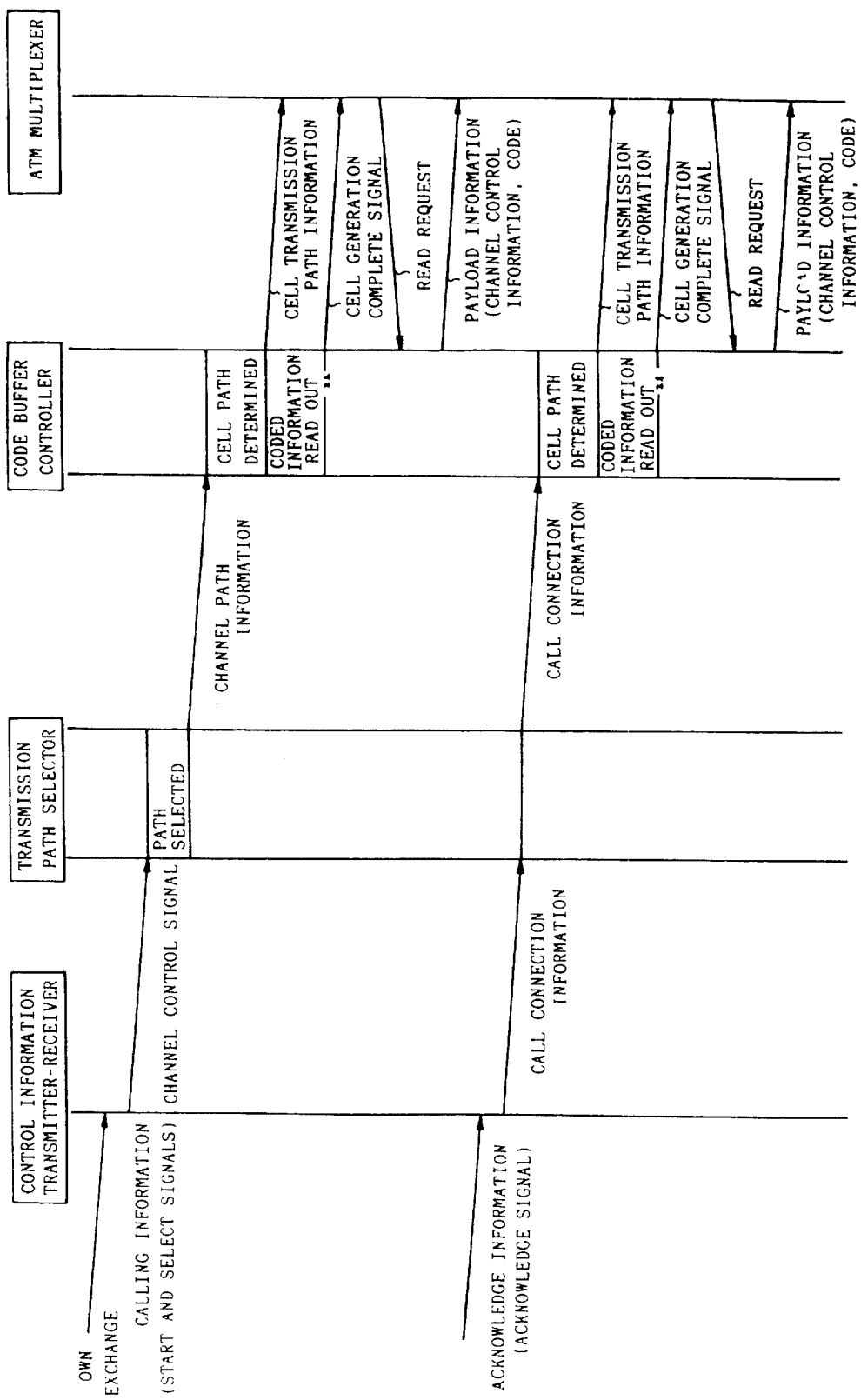
FIG. 9 is a view depicting typical sequences of control operations in effect when a call is connected by the first embodiment.

Described below with reference to FIGS. 9 through 12 are the sequences of control operations in effect when a call is made by the first embodiment. In FIG. 9, the upper half shows the sequence of control operations on the calling side of the ATM transmission apparatus 4, and the lower half indicates the sequence of control operations on the called side of the ATM transmission apparatus 4.

On the calling side of the ATM transmission apparatus 4, as shown in the upper part of FIG. 9, the control signal transmitter-receiver 15 in the call monitor 46 receives call information, i.e., a start signal and a selection signal, from a calling subscriber's terminal 2 belonging to the same exchange 1. At that point, the control signal transmitter-receiver 15 extracts a channel control signal from the received information and sends the signal to the transmission path selector 16.

Based on the channel control signal received, the transmission path selector 16 selects an appropriate transmission path, generates channel path information, and sends the information to the code buffer controller 12. In turn, the code buffer controller 12 determines the path of an ATM cell to be generated on the basis of the channel path information. With the cell path determined, the code buffer controller 12 sends cell transmission path information to the ATM multiplexer 13.

Concurrently, the code buffer controller 12 reads coded information from the code buffer 42. If any of the channels involved is busy with a call, the code buffer controller 12 notifies the ATM multiplexer 13 with only the control signal such as cell transmission path information until an acknowledge signal is received from the opposite exchange. It is only after the opposite exchange 1 acknowledges receipt and completion of the call and its connection that the coded information is transmitted to the ATM multiplexer 13.

Figure 10:
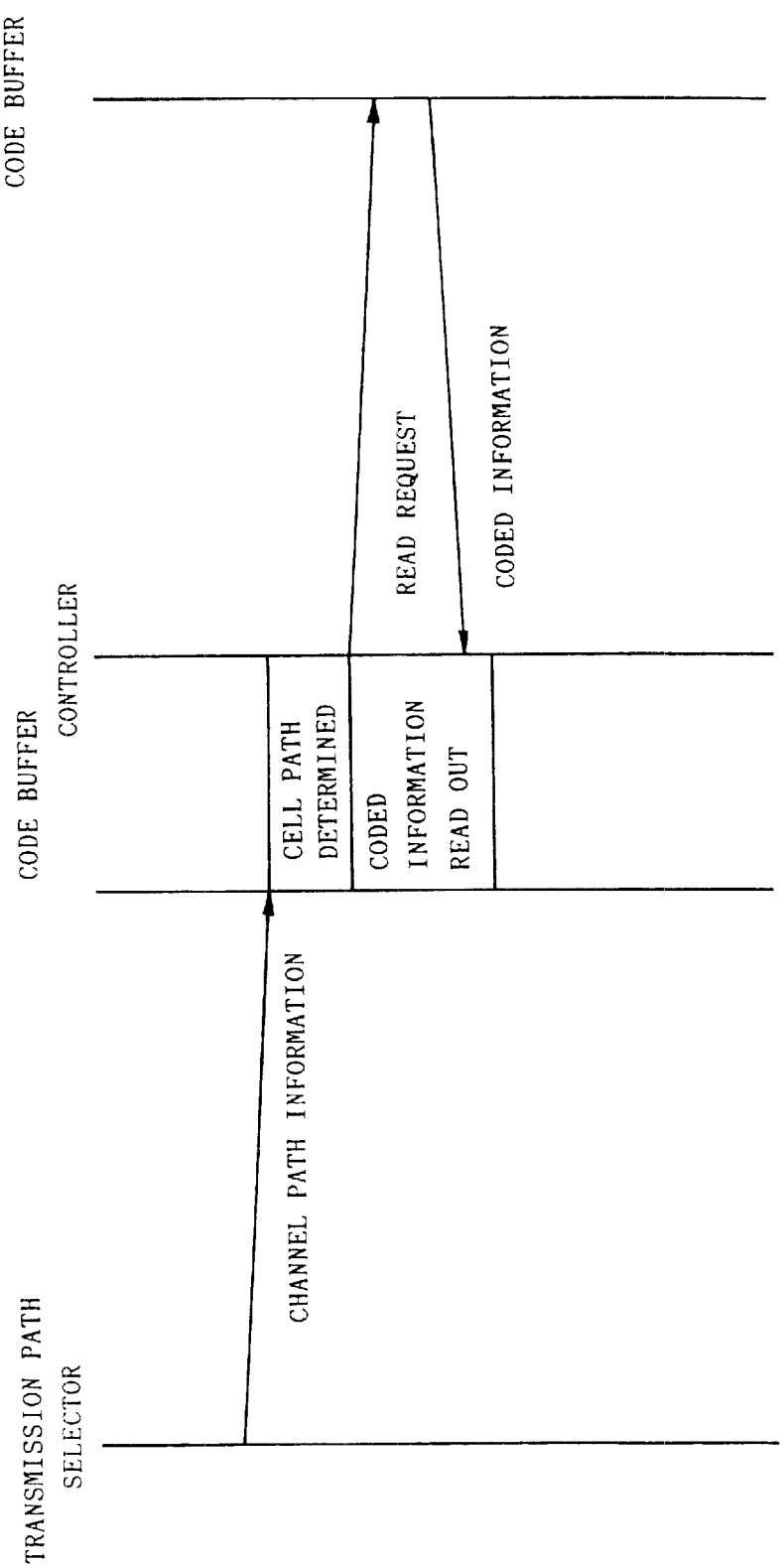
FIG. 10 is a view portraying the sequence of operations between a code buffer controller and a code buffer on the calling side where a call is connected by the first embodiment.

FIG. 10 portrays the sequence of operations performed between the code buffer controller 12 and the code buffer 42 in the above setup. As described, upon receipt of the channel path information from the transmission path selector 16, the code buffer controller 12 determines the cell path and makes a read request to the code buffer 42 by designating an appropriate address thereto. The coded information is read from the code buffer 42 in response to the read request and is transferred to the code buffer controller 12. When one cell of coded information has been read out by the code buffer controller 12, the controller 12 outputs a cell generation complete notice to the ATM multiplexer 13. The cell generation complete notice prompts the ATM multiplexer 13 to make a read request. In turn, the code buffer controller 12 supplies the ATM multiplexer 13 with payload information made of the channel control signal and of the coded information.

When the ATM multiplexer 13 prefixes the header 7 to the payload information, the result is an ATM cell 10 that is transferred through the cross connection multiplexer 45 of FIG. 5 and on to the ATM transmission line 3.

Figure 11:
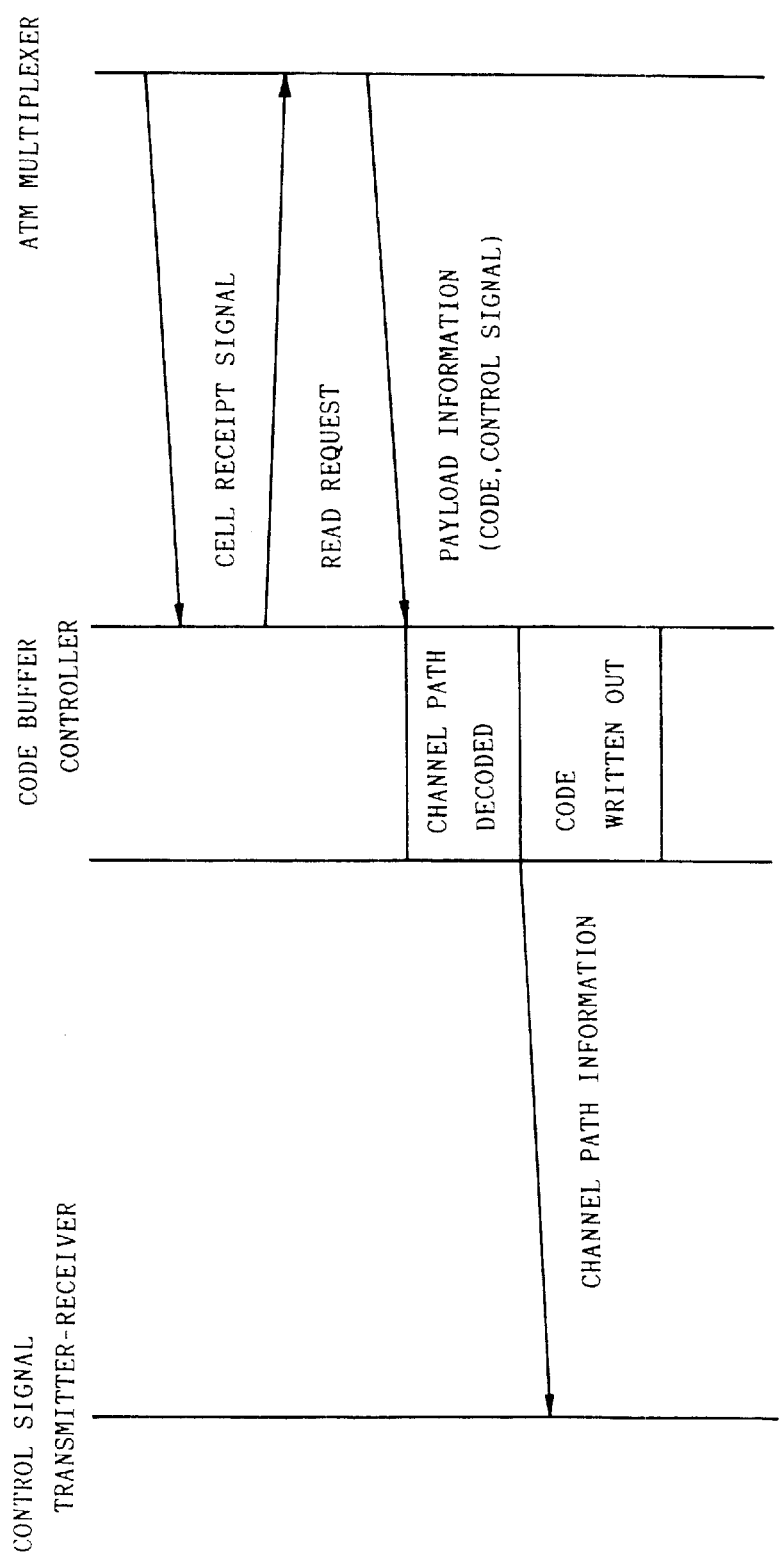
FIG. 11 is a view showing the sequence of operations between a code buffer controller and an ATM multiplexer on the called part where a call is connected by the first embodiment.

FIG. 11 shows the sequence of operations in effect when call information sent from the ATM transmission apparatus 4 on the calling side is received as the ATM cell 10 by the ATM transmission apparatus 4 on the receiving side. Upon receipt of the ATM cell 10, the ATM multiplexer 13 sends a cell receipt acknowledge signal to the code buffer controller 12 within the receiving-side ATM transmission apparatus 4. In turn, the code buffer controller 12 makes a read request to the ATM multiplexer 13. The read request prompts the ATM multiplexer 13 to read the payload information (coded and control information) from the ATM cell 10. The code buffer controller decodes the channel path, and the decoded channel path information is sent by the code buffer controller 12 to the control signal transmitter-receiver 15. The channel path information received by the control signal transmitter-receiver 15 is sent both to the call monitor units 38 (FIG. 8) and to the transmission path selector 16.

Figure 12:
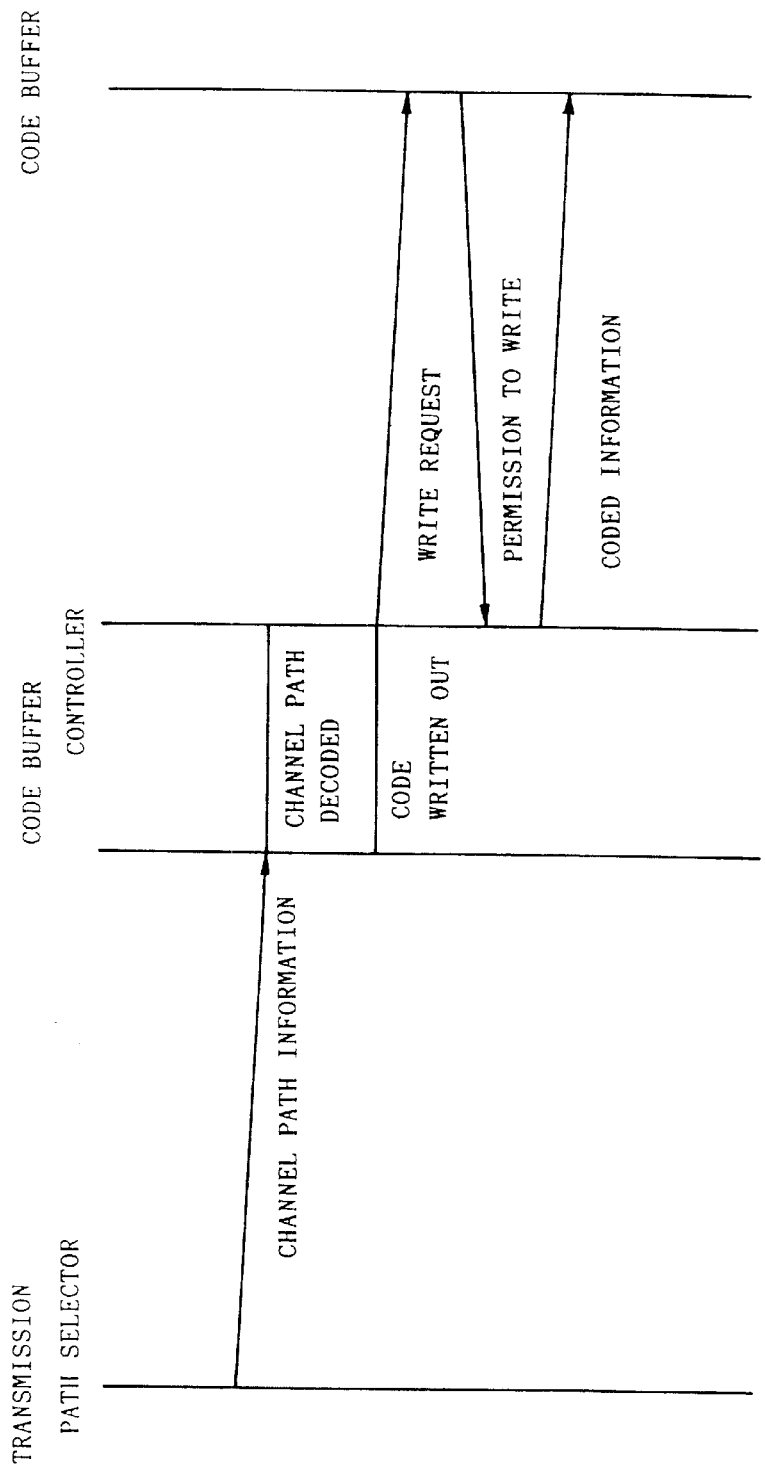
FIG. 12 is a view depicting the sequence of operations between a code buffer controller and a code buffer on the called side where a call is connected by the first embodiment.

In parallel with the above process, the code buffer controller 12 writes the coded information to the code buffer 42. The sequence of the write operation is shown in FIG. 12. Specifically, upon receipt of the path information from the transmission path selector 16, the code buffer controller 12 decodes the channel path and makes a write request to the code buffer 42. When the code buffer 42 grants permission to write, the code buffer controller 12 writes to the code buffer 42 the coded information obtained from the payload 8 in the ATM cell 10. Subsequent operations, not shown in FIG. 12, include outputting the coded information that came from the code buffer 42 onto the ATM transmission line 3 and transmitting the information to the called subscriber's terminal.

The lower half of FIG. 9 depicts the sequence of operations performed by the ATM transmission apparatus 4 on the called side when the call is acknowledged by the called subscriber. Specifically, when the called-side ATM transmission apparatus 4 receives acknowledge information (acknowledge signal) from the called subscriber, a call connection signal is extracted by the control signal transmitter-receiver 15 from the received information and is sent to the code buffer controller 12 via the transmission path selector 16. Then in the same sequence as shown in FIG. 10, the coded information is read from the code buffer 42 for cell generation. The payload information is forwarded to the ATM multiplexer 13.

The ATM multiplexer 13 prefixes the header 7 to the payload information. The payload information prefixed with the header 7 is sent to the cross connection multiplexer 45. In turn, the cross connection multiplexer 45 transmits the acknowledge information as an ATM cell 10 to the ATM transmission apparatus 4 on the calling side.

As described, the first embodiment works roughly as follows: when the code buffers 42 corresponding to the six calls that share a virtual path identifier VPI and a virtual channel identifier VCI have each accumulated five sets of coded information, the data multiplexer 36 (buffer controller 12) in the ATM transmission apparatus 4 starts assembling one set of payload information using separately collected control and alarm information. At this point, it takes 3,125 Ns (i.e., 625×5) for each of the code buffers 42 to accumulate five sets of coded information. That is, the coded information accumulation time with the code buffers 42 is reduced to 5/36 of the time normally calculated with the prior art ATM transmission apparatus 4 (22,500 Ns).

Second Embodiment

The second embodiment is arranged to further multiplex ATM cells 10 into a new ATM cell 10 through remapping in an ATM node (i.e., ATM transmission apparatus 4), the new ATM cell being output onto the ATM transmission line 3. Among the plurality of ATM cells 10 to be multiplexed, the VCI value of a given ATM cell 10 is taken as the VCI value of the header 7 for the new ATM cell 10. The VCI values of the old ATM cells 10 are stored as channel identification information in the payload 8 of the new ATM cell 10.

Figure 13:
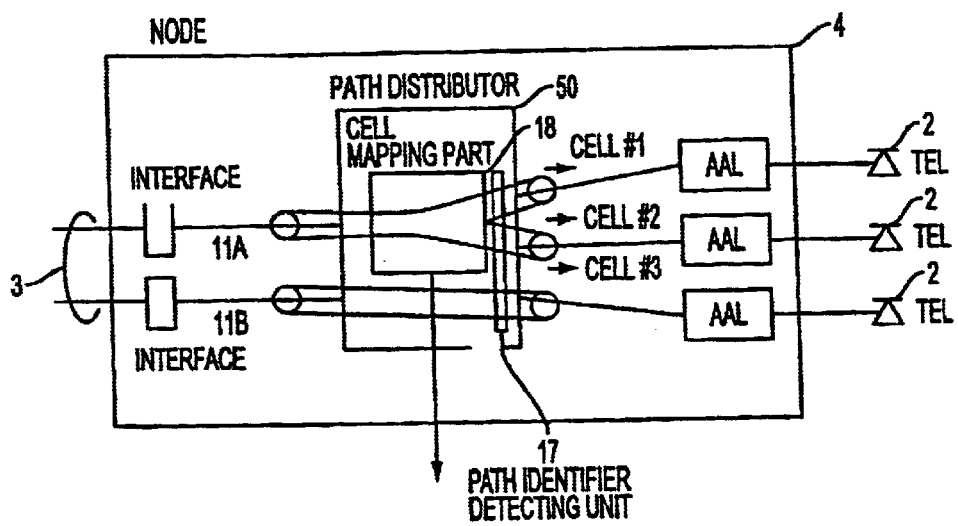
FIG. 13 is a view illustrating the overall system configuration of a second embodiment of the invention.

As depicted in FIG. 13, the system configuration of the ATM transmission apparatus 4 in the second embodiment includes ATM converters (AAL's) and a path distributor 50. The path distributor 50 contains a path identifier detecting unit 17 and a cell mapping part 18, the path identifier detecting unit operating as the call monitoring means 100.

What characterizes the second embodiment is that the signals from subscriber terminals 2 are converted by the ATM converters (AAL's) Into ATM cells which are then remapped by the path distributor 50 into a newly multiplexed ATM cell 10 for output.

Figure 14:
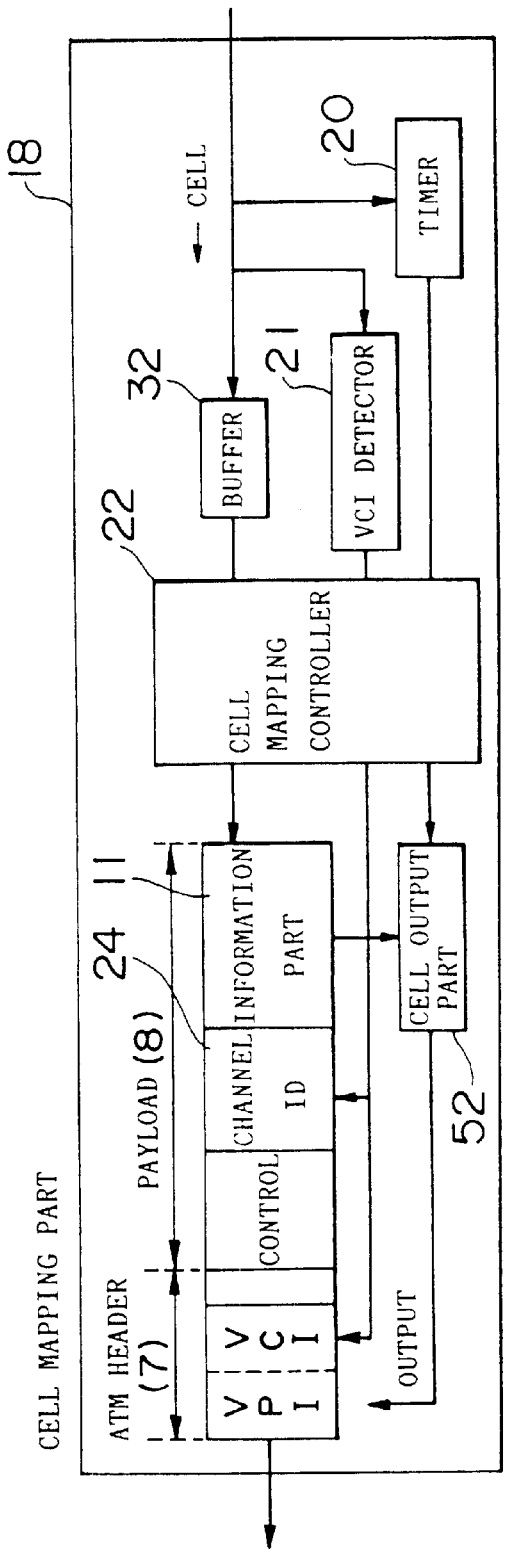
FIG. 14 is a function block diagram of a cell mapping part in the second embodiment.

In FIG. 13, the path identifier detecting unit 17 acts as a kind of selector. While receiving information in the form of ATM cells 10 from the ATM converters (AAL's), the path identifier detecting unit 17 detects VPI values from these cells. If ATM cells 10 found destined to the same path based on VPI detection are received within a predetermined period of time, the path identifier detecting unit 17 inputs these ATM cells into the cell mapping part 18. In FIG. 14 cell #1 and #2 have the same VIP value.

When a first ATM cell 10 (i.e., first cell #1 given after timer reset) arrives from an ATM converter (AAL), the timer 20 is activated and the VCI detector 21 is fed with a pulse signal indicating the input of the first ATM cell 10 (cell #1). The VCI detector 21 detects the VCI value from the cell, and notifies the cell mapping controller 22 of the VCI value of the first ATM cell 10 (cell #1).

The cell mapping controller 22 then assembles a new ATM cell 10 (cell #A) with its VCI value taken from the first ATM cell 10 (cell #1). That VCI value is also stored in a channel ID part 24 of the payload 8.

When the path identifier detecting unit 17 detects the arrival of an ATM cell (cell #2) having the same VPI value as that of the first cell before time is up on the timer 20, the VCI detector 21 reads the VCI value from the header 7 of the ATM cell 10 (cell #2). The cell mapping controller 22 writes the VCI value of the ATM cell (cell #2) only to the channel ID part 24 in a payload control information part 23 of the payload 8. Thereafter, whenever an ATM cell 10 is input of which the VPI value is the same as the above, the VCI value is stored successively into the channel ID part 24 of the payload 8. The successive storage of VCI values into the channel ID part 24 continues until a time-out is reached on the timer 20.

Concurrently with the storage of the VCI values, the information on the ATM cells 10 (cells #1, #2, etc.) is stored consecutively into a user information part 11 of the payload 8.

Figure 15:
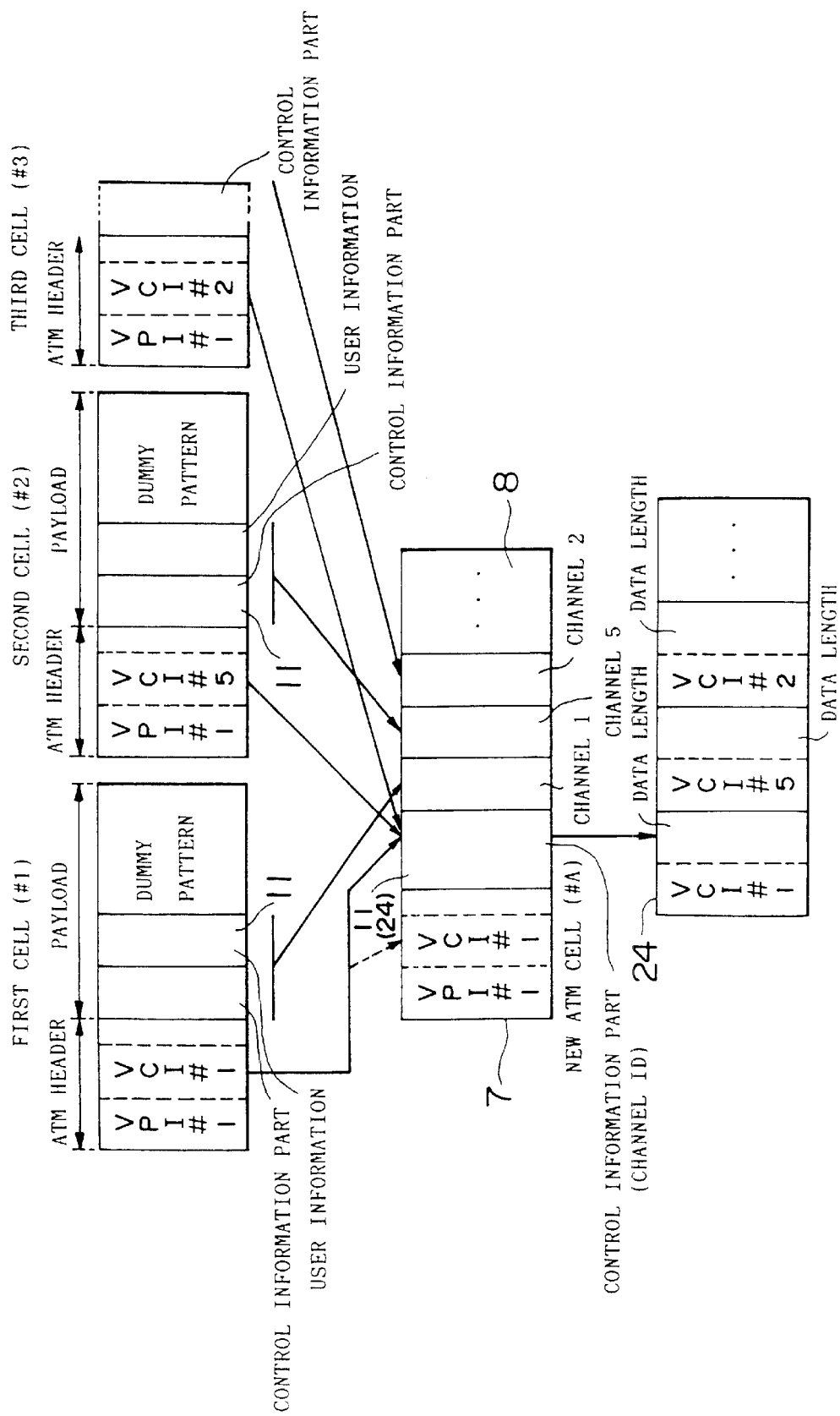
FIG. 15 is a conceptual view showing how ATM cells are multiplexed by the second embodiment.

FIG. 15 illustrates how ATM cells (cells #1, #2, etc.) are related in format to the new ATM cell (cell #A) in connection with the second embodiment. As shown, the VPI and VCI values of the first ATM cell (cell #1) are adopted as those of the new ATM cell 10 (cell #A). The VCI information of the second and subsequent ATM cells is stored successively into the channel ID part 24. The control information and user information of the ATM cells 10 are placed for each channel into areas of a fixed length each within the user information part 11 of the payload 8 in the new ATM cell 10 (cell #A).

The channel ID part 24 accommodates, in addition to the VCI values of the ATM cells 10 (cells #1, #2, etc.), data length information indicating the amount of information (significant bit count or byte length) of each old ATM cell 10. If the control information is the same or common to the channels 5, the information may alternatively be written to an appropriate address of the new ATM cell 10 (cell #A). Where one sampled data item is fixed to a data length of eight bits, as with 64-kbps PCM audio information, the data length information may be stored as a single item or may be omitted altogether.

When a predetermined period of time has elapsed on the timer 20 (i.e., upon time-out), the timer 20 outputs a trigger signal to the cell output part 52 through the cell mapping controller 22. With the trigger signal output, the VPI value is written to the header 7 of the new ATM cell 10 (cell #A) via the cell output part 52. The ATM cell 10 (cell #A) is then output onto the transmission line.

Even before the time-out of the timer 20, the cell mapping part 18 outputs the trigger signal to the cell output part 52 if the user information part 11 of the ATM cell 10 (cell #A) has been filled to capacity with information. This prompts the output of the ATM cell 10 (cell #A). At this point, the timer 20 is reset regardless of the time-out that may or may not be reached on the timer.

In the receiving side ATM node, the old VCI values of the old ATM cells (cells #1, #2, etc.) are extracted from the channel ID part 24 in the payload 8 of the new ATM cell 10 (cell #A). At the same time, the data length information is read out to determine the allocation of the information for the respective old cells. The operations combine to reassemble the old ATM cells 10 (cells #1, #2, etc.).

Although the above setup involves storing the VCI value of the first ATM cell (cell #1) in the channel ID part 24 of the payload 8, the channel ID part 24 may alternatively accommodate the VCI values of the second and subsequent ATM cells 10 (from cell #2 on). In the latter case, the VCI value in the header 7 of the ATM cell 10 (cell #A) that has arrived may be used unchanged as the first user information on the receiving side.

Although the above setup uses the VCI value of the first ATM cell 10 (cell #1) as the VCI value of the new ATM cell 10 (cell #A), an alternative arrangement may be employed. Specifically, the maximum or minimum VCI value of the old ATM cells 10 (cells #1, #2, etc.) may be detected by the VCI detector 21. Then the cell mapping part 18 may write the maximum or minimum VCI value to the header 7 of the new ATM cell 10 (cell #A). In this case, the writing of the VCI value to the header 7 of the new ATM cell 10 (cell #A) is accomplished after mapping.

As described, the second embodiment assembles old ATM cells 10 (#1, #2, etc.) regardless of their many dummy patterns (see FIG. 15) into a new ATM cell (#A) with no dummy pattern. In this manner, the payload 8 of the new ATM cell 10 is utilized efficiently. Because the assembly of the new ATM cell 10 is monitored by the timer 20, there is no delay in the output of that cell.

Figure 16:
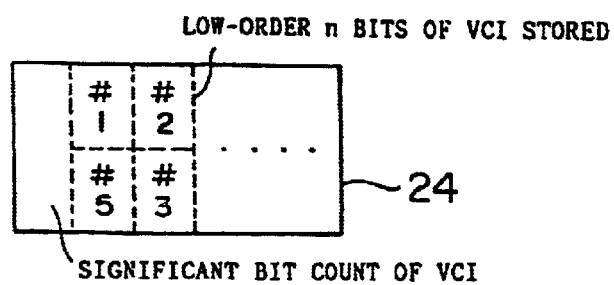
FIG. 16 is a view depicting the format of a channel identifier in a new ATM cell produced by the second embodiment.

FIG. 16 depicts the format of a channel ID part in a new ATM cell (#A) produced by a variation of the second embodiment. One way to apportion VPI and VCI values of ATM cells in the channel ID format is to set low-order n bits as per the number of paths or channels needed by the user while the high-order bits are fixed (e.g., all bits fixed to zero). In the example of FIG. 16, the channel ID part 24 of the new ATM cell 10 (#A) accommodates only the low-order n bits and VCI significant bit count of the VCI values from the old ATM cells 10 (#1, #2, etc.).

According to the preceding method, three bits are enough when it comes to expressing, say, five channels for use by a single path (VPI). Even if the use of "000" is prohibited by the user, a three-bit format provides expressions of up to seven channels (001–111).

Where the above method is employed, the cell mapping part 22 takes the significant bit count n (n=7 in the above example) of the VCI values from the input ATM cells 10 (#1, #2, etc.) and stores the count into a significant bit count storage part of the channel ID part 24 in the payload 8. Following the bit count storage part, the cell mapping part 22 stores consecutively the low-order n bits of the VCI values from the input ATM cells 10.

The value n may be determined in one of two ways: either it is set when entered initially through the network, or it is determined as needed based on the information obtained from the VCI detector 21. In any case, the format of FIG. 16 allows the channel ID part 24 to be used efficiently so that an extensive user information part 11 will be secured in the payload 8.

Third Embodiment

In the third embodiment, an ATM node (i.e., ATM transmission apparatus 4) further multiplexes the information in the form of ATM cells 10 into a new ATM cell 10 through remapping, and outputs the new ATM cell to another ATM node. Among the plurality of ATM cells 10 to be multiplexed, the VCI value of a given ATM cell 10 is taken as the VCI value of the header 7 for the new ATM cell 10. The VCI values of the old ATM cells 10 are converted to channel numbers through a VCI management table 25 for storage into the channel ID part 24 of the new ATM cell 10.

Figure 17:
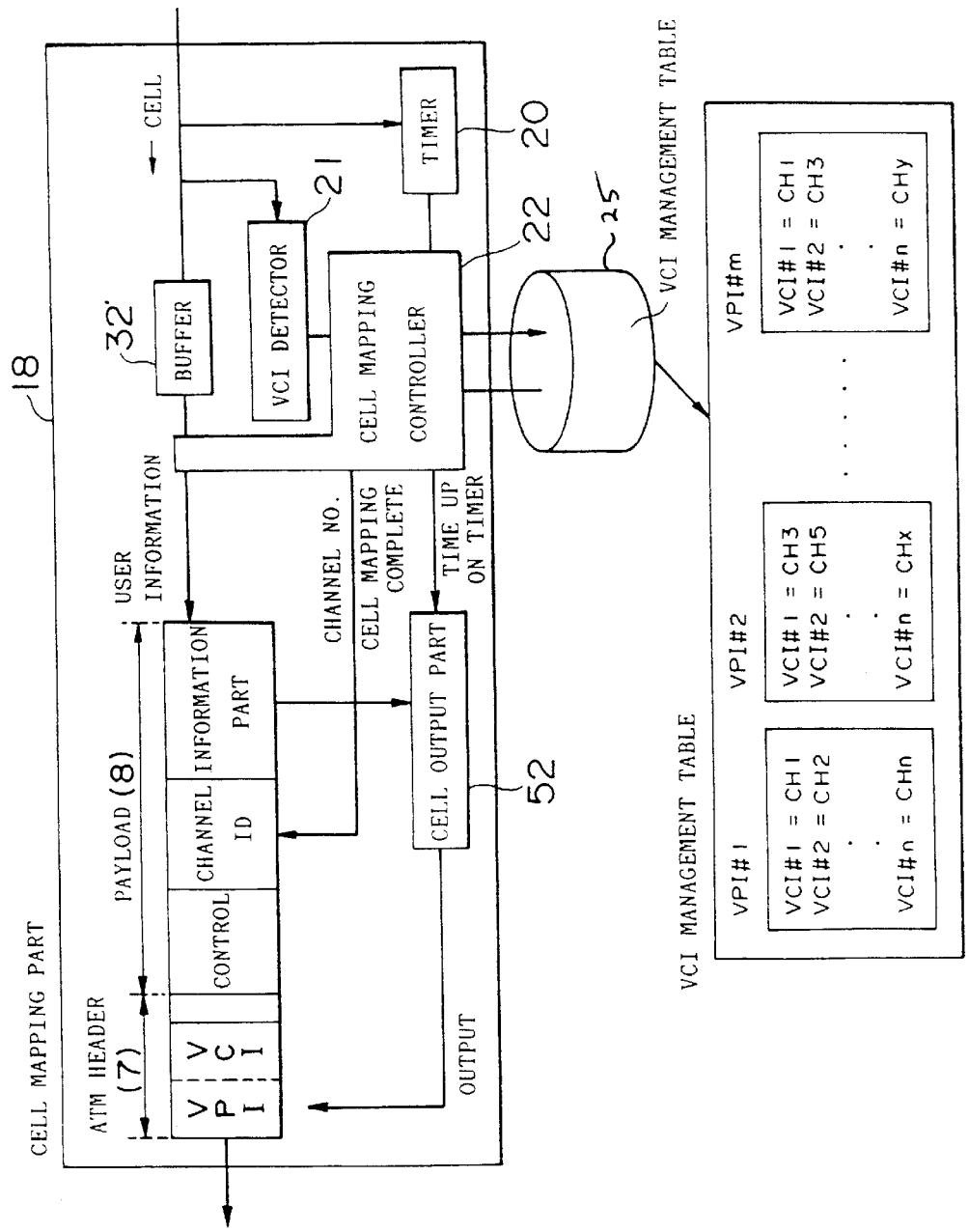
FIG. 17 is a block diagram portraying the overall system configuration of a third embodiment of the invention.

FIG. 17 portrays the system configuration of the third embodiment. In FIG. 17, the cell mapping controller 22 is basically the same in composition as that of the second embodiment except for the VCI management table 25 shown in the figure. The other components that are functionally identical to those described in connection with the second embodiment are designated by the same reference numerals, and any repetitive description thereof is omitted. As depicted in FIG. 17, the VCI management table 25 is made of conversion tables each converting the VCI numbers under a given VPI into channel numbers.

When notified of the VCI values of the old ATM cells 10 (#1, #2, etc.) by the VCI detector 21, the cell mapping controller 22 references the conversion table of the applicable VPI in the VCI management table 25, and reads the corresponding channel numbers therefrom. The channel numbers thus read out are written consecutively, together with data length information, to the channel ID part 24 of the new ATM cell 10 (#A).

Figure 18:
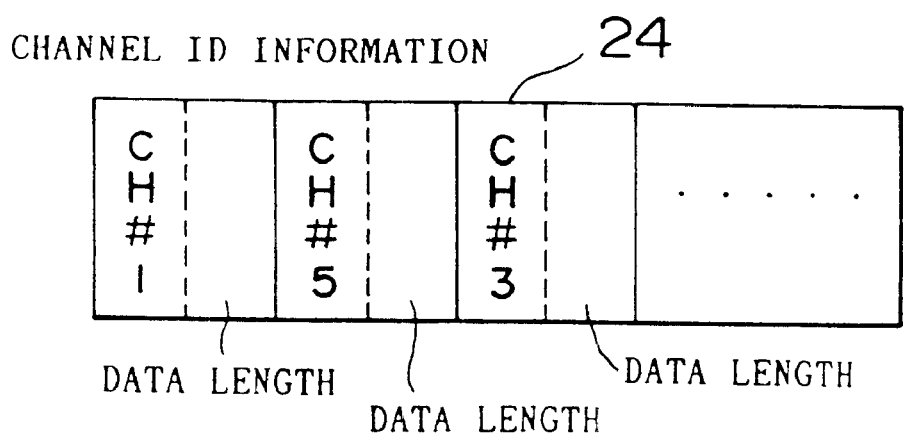
FIG. 18 is a view illustrating the format of a channel ID part in a new ATM cell produced by the third embodiment.

FIG. 18 illustrates the format of the channel ID part 24 in a new ATM cell produced by the third embodiment. As with the second embodiment, if the data length is the same throughout the payload user information part 11 of this format, only one data length may be stored, or the storage of data lengths may be omitted altogether.

Fourth Embodiment

In the fourth embodiment, an ATM node (i.e., ATM transmission apparatus 4) further multiplexes the information in the form of ATM cells 10 into a new ATM cell 10 through remapping, and outputs the new ATM cell to another ATM node. What characterizes the fourth embodiment is that a representative VCI indicating a plurality of multiplexed cells is stored as the VCI value of the new ATM cell 10.

Figure 19:
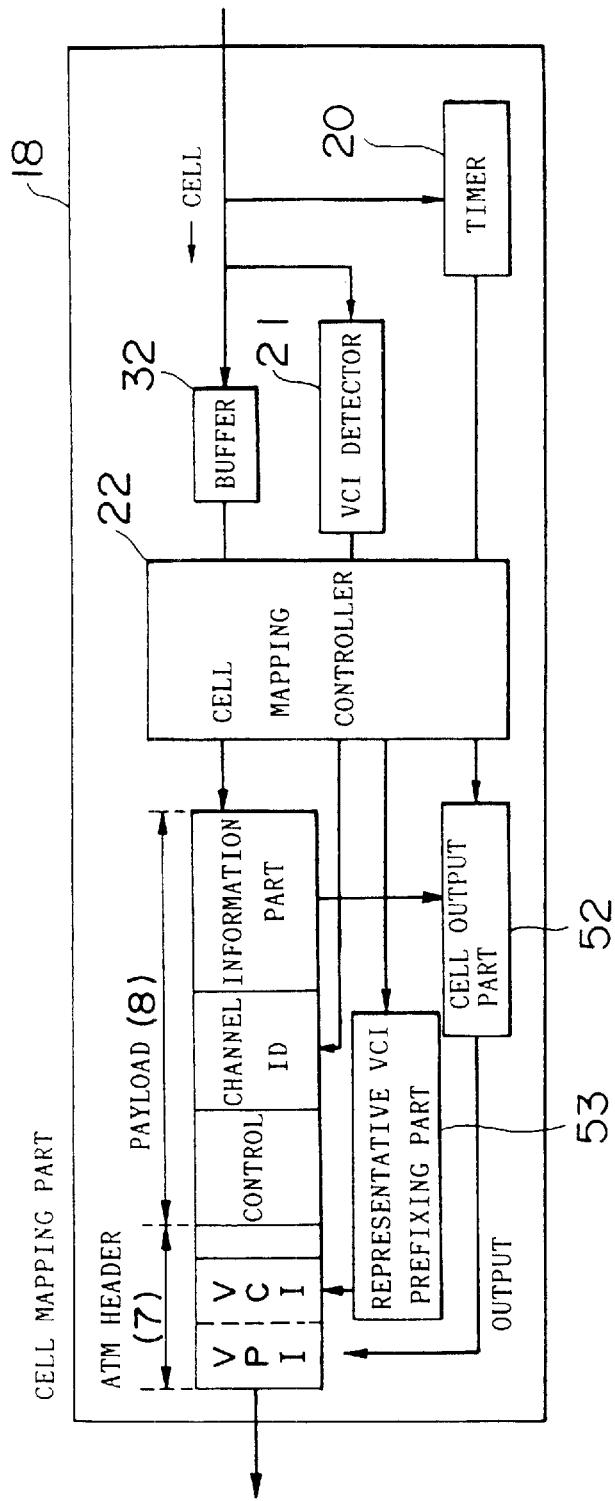
FIG. 19 is a block diagram depicting the overall system configuration of a fourth embodiment of the invention.

FIG. 19 depicts the system configuration of the fourth embodiment which includes a representative VCI prefixing part 53. The other components that are functionally identical to those described in connection with the second embodiment are designated by the same reference numerals, and any repetitive description thereof is omitted.

Figure 20:
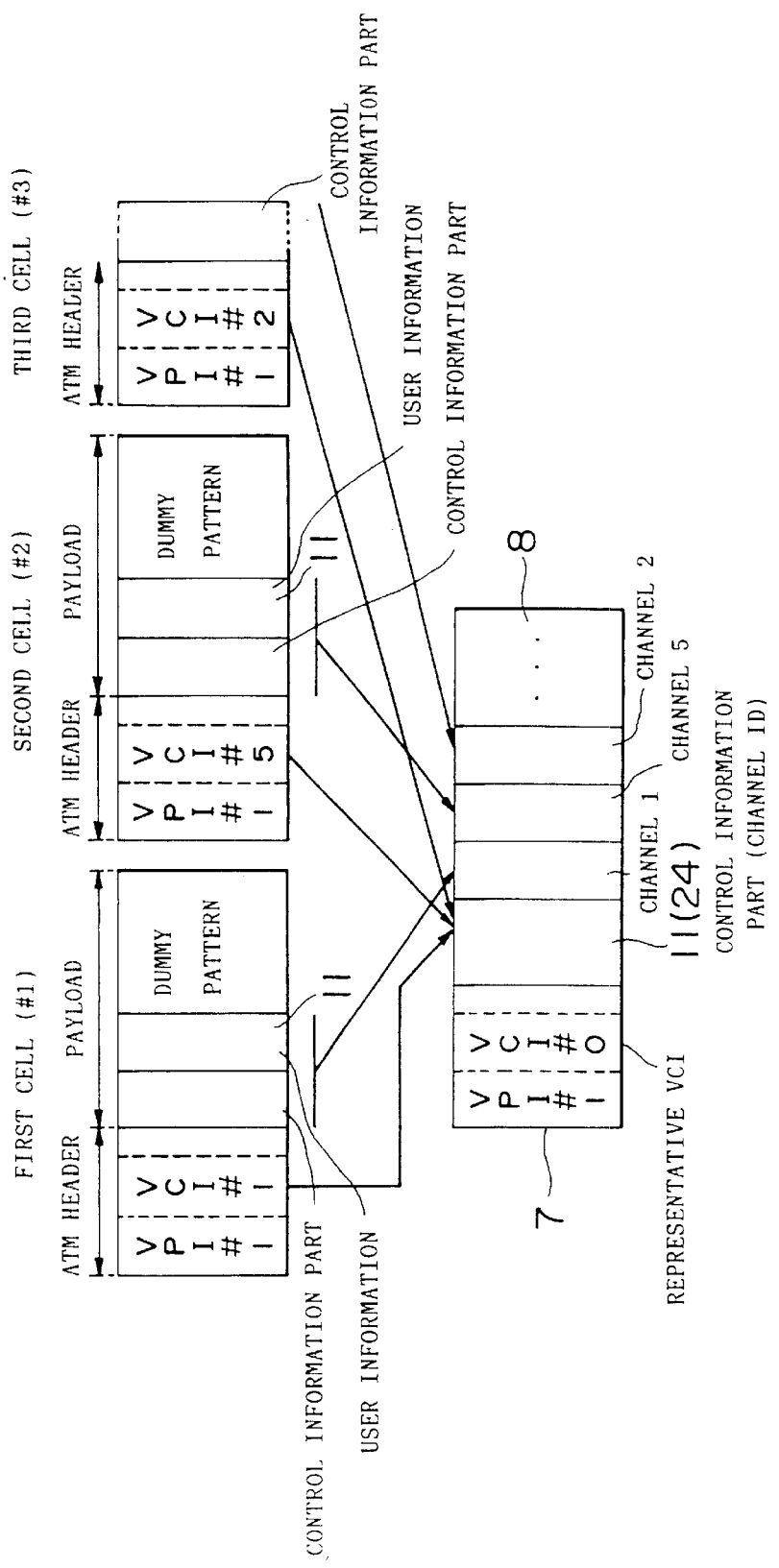
FIG. 20 is a conceptual view showing how ATM cells are multiplexed by the fourth embodiment.

With the fourth embodiment, the cell mapping controller 22 sends a trigger signal to the representative VCI prefixing part 53 immediately after reset or time-out of the timer 20 or when the user information part 11 of the payload 8 has been filled with information. This causes the representative VCI value to be written to the header 7 of the new ATM cell 10 (#A). The representative VCI stands for a plurality of cells being multiplexed and is preferably reserved as a special number. FIG. 20 shows how old ATM cells 10 (#1, #2, etc.) compare in format with the new ATM cell 10 (#A) in connection with the fourth embodiment.

Upon receipt of the multiplexed ATM cell 10 (#A) prefixed with the representative VCI, the ATM node on the receiving side disassembles the ATM cell 10 (#A) into the original plurality of ATM cells 10 (#1, #2, etc.). The disassembled ATM cells 10 are transferred to the terminals corresponding thereto. If an ATM cell 10 (#B) has no representative VCI prefixed thereto, the cell is transferred intact to the corresponding terminal or ATM transmission apparatus 4.

The prefixing of the representative VCI may be implemented by combining the methods of the second and third embodiments.

Fifth Embodiment

The fifth embodiment involves dividing into variable lengths a plurality of items of information generated by terminals (i.e., terminal equipment; TE) in an in-house setup and multiplexing these items in the payload 8 of an ATM cell 10.

Figure 21:
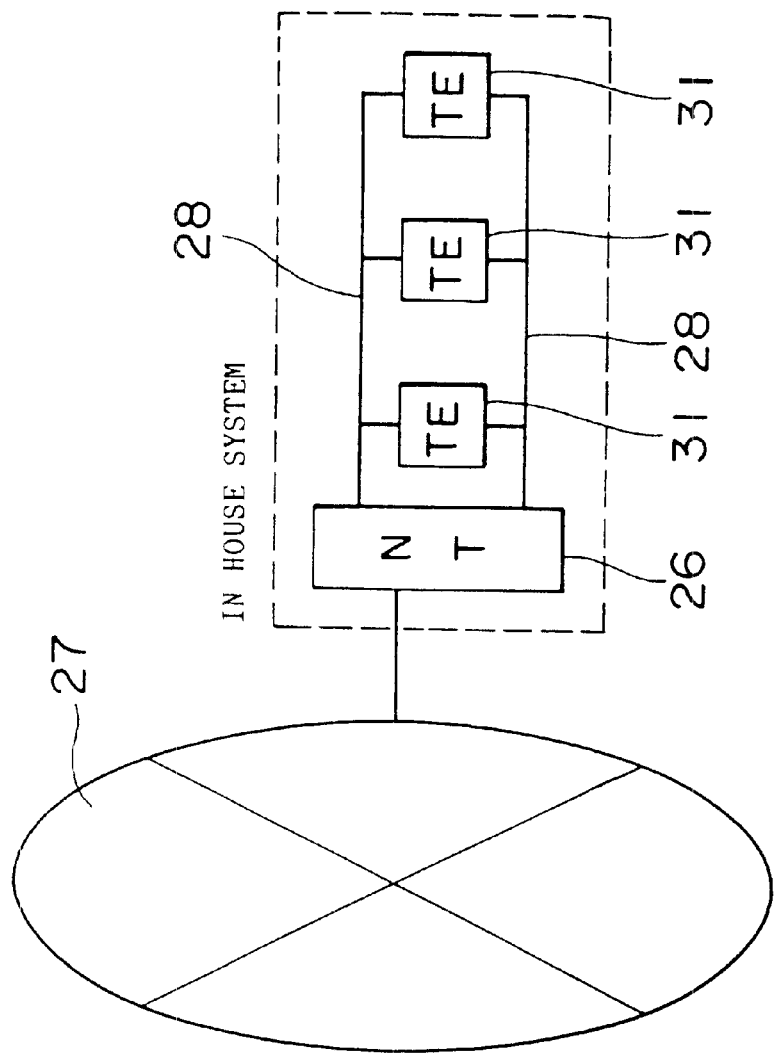
FIG. 21 is a block diagram sketching the overall system configuration of a fifth embodiment of the invention.
Figure 22:
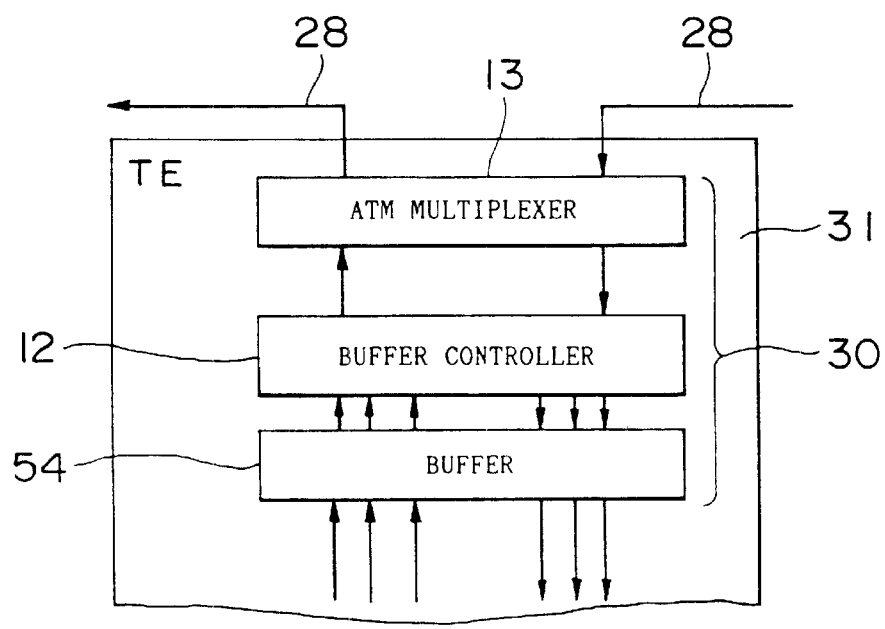
FIG. 22 is a block diagram of an interface part that handles the transmission and reception of ATM cells in the fifth embodiment.

FIG. 21 sketches the overall system configuration of the fifth embodiment. In the in-house setup of FIG. 21, terminals 31 (TE) connected to in-house bus means 28 coming from network transit switching equipment 26 are illustratively multimedia terminals. Each of these terminals incorporates a pair of interface parts 30 (See FIG. 22) that transmit and receive image information, audio information, text data and other data in the form of ATM cells 10. FIG. 22 illustrates an interface part 30 in more detail. As depicted, the interface part 30 comprises an ATM multiplexer 13, a buffer controller 12 and a buffer 54. In each terminal (TE), one interface part 30 is located on the upward-bound bus side and the other interface part 30 on the downward-bound bus side.

Figure 23:
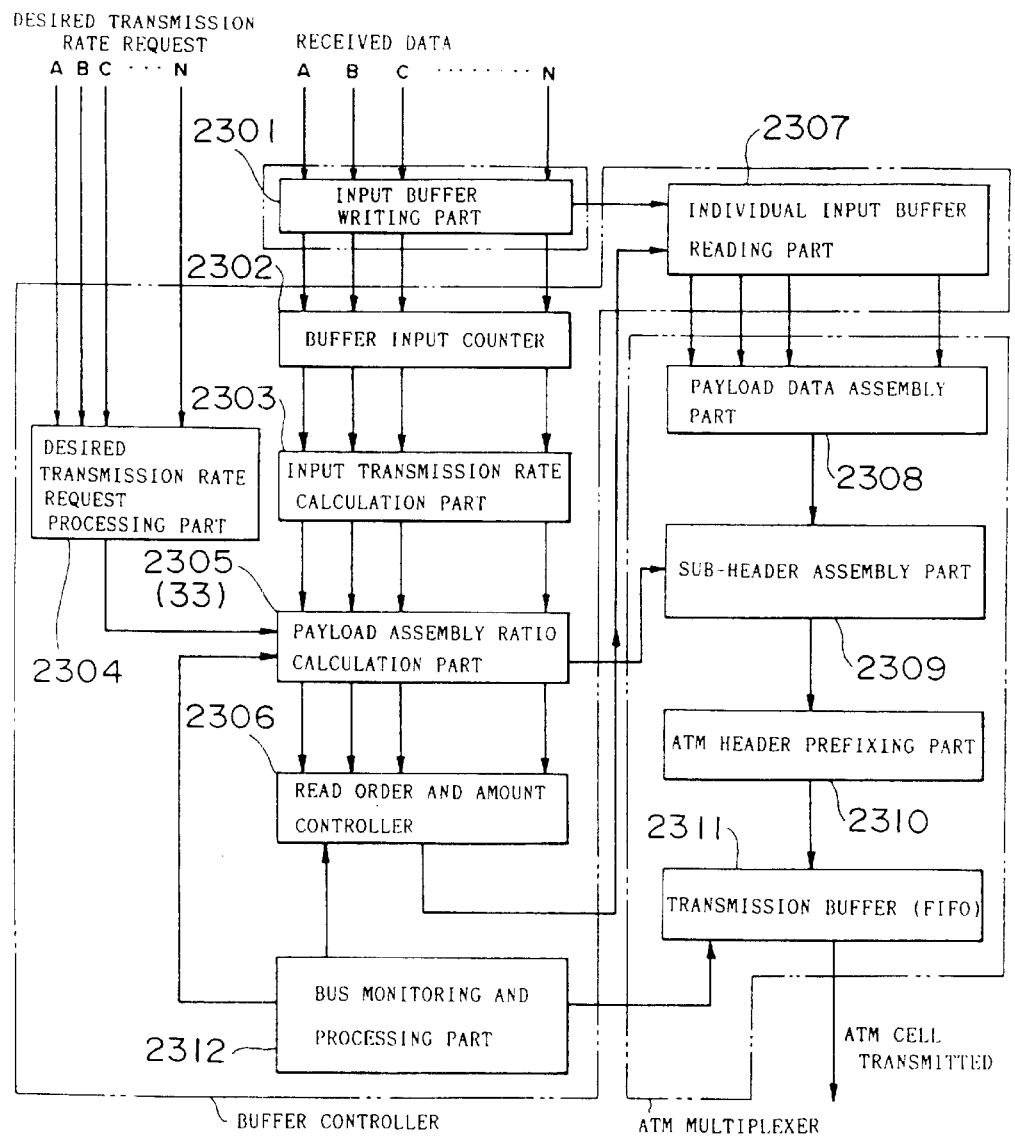
FIG. 23 is a function block diagram showing how a buffer controller and an ATM multiplexer operate on the transmitting side of the fifth embodiment.
Figure 24:
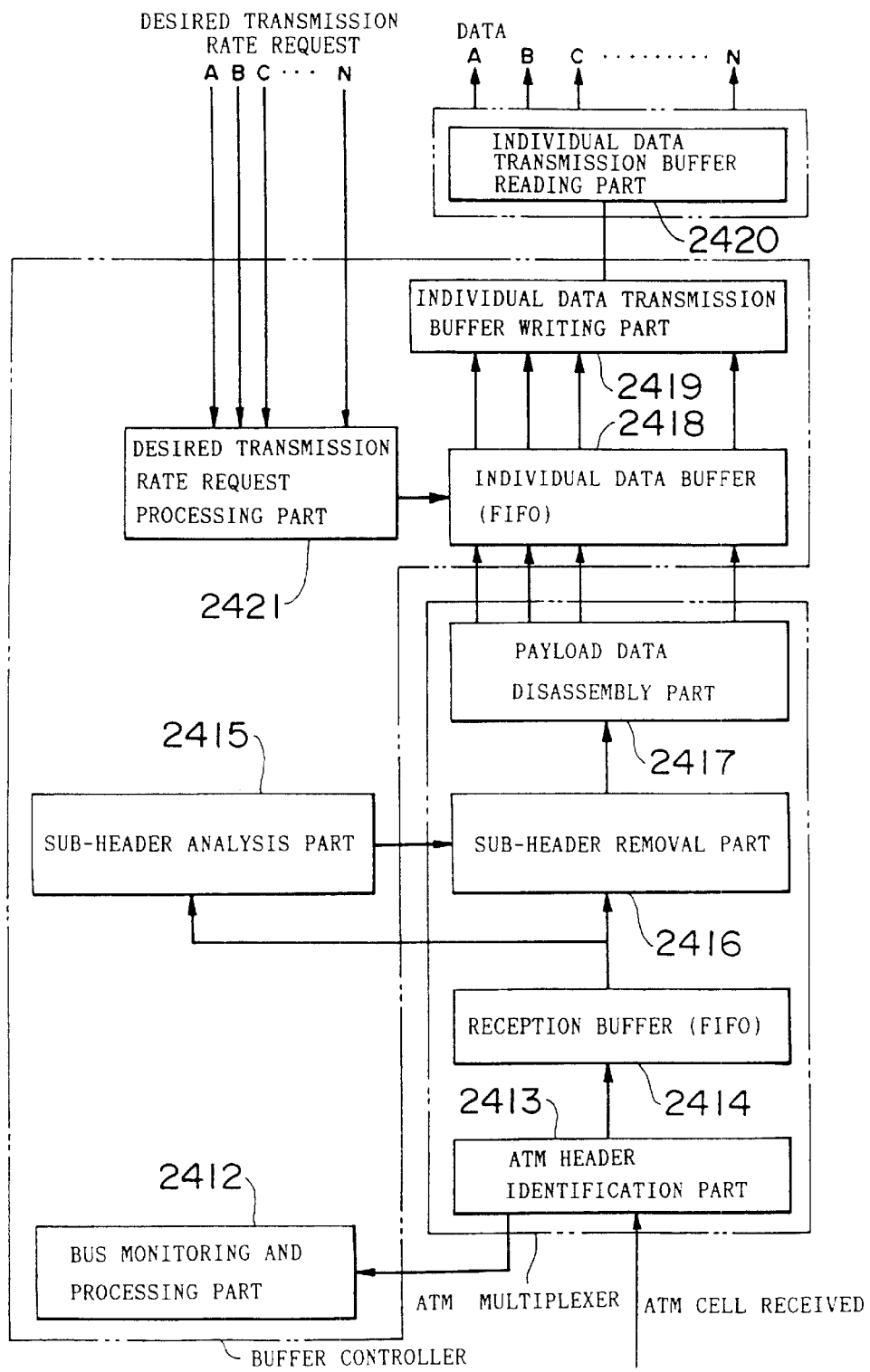
FIG. 24 is a function block diagram depicting how a buffer controller and an ATM multiplexer operate on the receiving side of the fifth embodiment.

FIG. 23 is a function block diagram showing how the buffer controller 12 and the ATM multiplexer 13 operate on the transmitting side of the fifth embodiment, and FIG. 24 is a function block diagram depicting how the same components operate on the receiving side.

What takes place on the transmitting side of the fifth embodiment in FIG. 23 is as follows: data items (A, B, C, ..., N) from terminals are first written to the buffer 54. When a buffer input counter 2302 has counted the data items up to a predetermined value, the counter notifies an input transmission rate calculation part 2303 that the predetermined count value is reached. Based on that input count value, the input transmission rate calculation part 2303 calculates the transmission rate of the input data and notifies a payload assembly ratio calculation part 2305 of that rate. At the same time, a desired transmission rate request processing part 2304 receives desired transmission rate requests from the terminals (TE) and notifies the payload assembly ratio calculation part 2305 of these requests.

Based on the received information and on the data from a bus monitoring and processing part 2312, the payload assembly ratio calculation part 2305 determines how the different data items are to be allocated in the payload 8. The data allocation thus determined is sent to a sub-header assembly part 2309 and to a read order and amount controller 2306 of the payload control information part 23.

In turn, the read order and amount controller 2306 activates individual input buffer reading part 2307 which reads necessary amounts of data from the buffer 54 in a predetermined order. The read-out data are handed over to a payload data assembly part 2308 of the ATM multiplexer 13.

After the sub-header assembly part 2309 prefixes the payload control information part 23 as a sub-header 7 to the payload 8, an ATM header prefixing part 2310 prefixes the other items of the header 7 (e.g., VPI, VCI) to the ATM cell 10. The completed ATM cell 10 is then sent to a transmission buffer 2311 (first-in first-out memory) in the ATM multiplexer 13. From the buffer 2311, the ATM cell 10 is output onto the in-house bus means 28.

What takes place on the receiving side of the fifth embodiment in FIG. 24 is as follows: when an ATM cell 10 is received through the in-house bus means 28 (FIGS. 21 and 22), cell receipt information is sent from an ATM header identification part 2413 to a bus monitoring and processing part 2412 within the ATM multiplexer 13. This causes necessary processing to take place according to the protocol (e.g., DQDB protocol) of the in-house bus means 28.

The ATM cell thus received is accumulated in a reception buffer 2414 (first-in first-out memory) in the ATM multiplexer 13. Thereafter, the ATM cell is sent both to a sub-header removal part 2416 and to a sub-header analysis part 2415, the latter analyzing the sub-header 7 held in the payload control information part 23. In accordance with the result of the analysis on the sub-header 7, the payload control information part 23 is removed and the user information part 11 of the payload 8 is disassembled by a payload data disassembly part 2417. Following disassembly, image information, audio information, text data and other data are transferred to individual data transmission buffer writing parts 2419 via individual data buffers 2418 (first-in first-out memory). These kinds of information are read from the buffers according to the transmission rate determined by a desired transmission rate request processing part 2421.

What characterizes the fifth embodiment is that, as discussed with reference to FIG. 23, the relative ratio at which to assemble different data into the payload 8 is varied (by the payload assembly ratio calculation part 2305) in accordance with the desired transmission rates requested and with the actually input transmission rate. While the first through the fourth embodiment allocate data in a fixed length format within the payload 8 upon multiplexing of information in the ATM cell 10, the fifth embodiment allocates data in a variable length format within the payload 8.

FIG. 25 is a conceptual view illustrating how ATM cells are multiplexed by the fifth embodiment. In FIG. 25, transmitted information composed of four data types (data A through data D in the upper part of the figure) is shown multiplexed in variable lengths (in the lower part of the figure) within the payload 8 of an ATM cell 10. These four kinds of data (data A–D) may be data for a different channel each (e.g., data A representing image, data B sound, data C text data). The fifth embodiment is particularly effective when used with an in-house setup wherein multimedia terminals connected to an in-house LAN are often required to transmit and receive information of different channels in synchronism.

Generally, the ATM cell 10 comprises the ATM header 7, payload control information part 23 and payload user information part 11. The ratio of assembling each of different types of information into the payload user information part 11 is calculated by the payload assembly ratio calculation part 2305. The ratio is determined after consideration of such factors as whether or not the information to be transmitted needs to be processed at high speed and whether or not the information is to be handled on a burst basis.

Figures 28, 29:
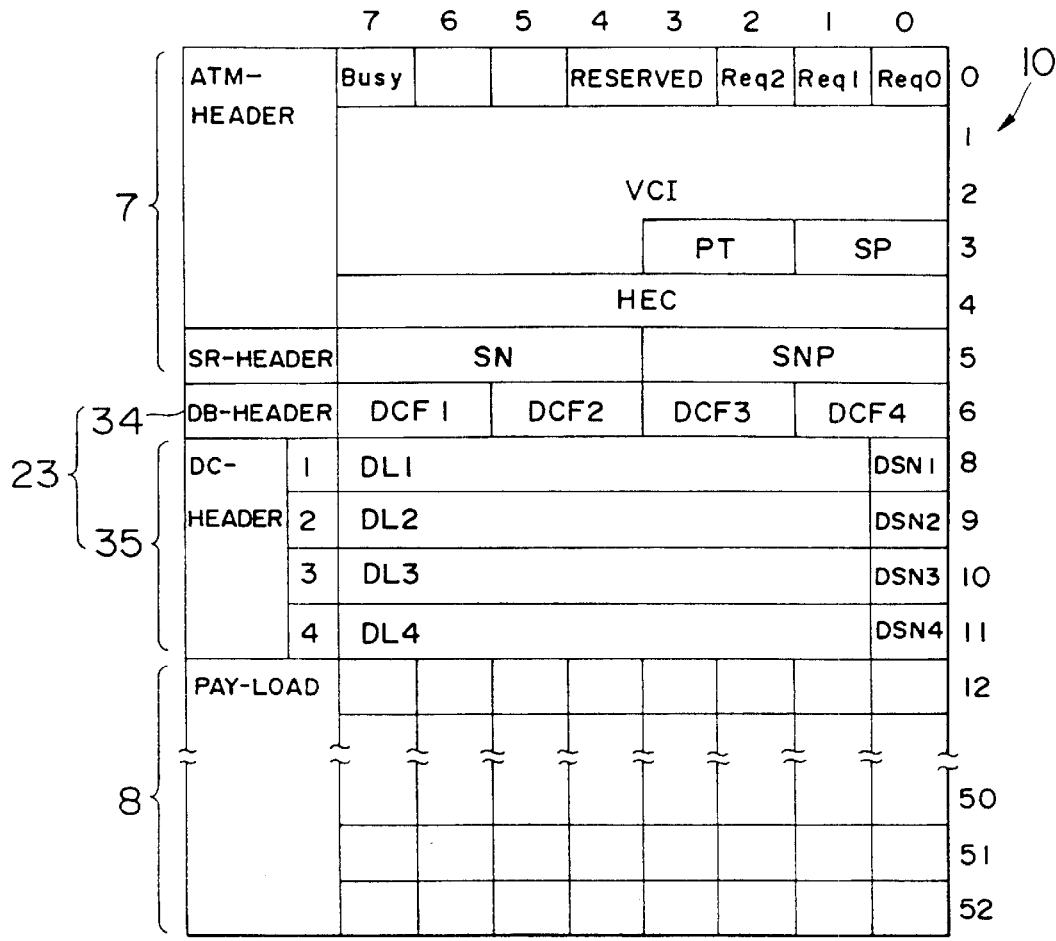
FIG. 28 is a view showing a detailed format of an ATM cell in connection with the fifth embodiment.
FIG. 29 is a view indicating what is typically meant by a DB header stored in a payload control information part in connection with the fifth embodiment.

FIG. 26 shows typical contents of payload control information parts in ATM cells (i.e., lower half of what is depicted in FIG. 25) in connection with the fifth embodiment, and FIG. 28 gives a detailed format of one of such ATM cells. As illustrated in FIG. 28, the payload control information part 23 contains a DB header (first control area 34) and a DC header (second control area 35). The DB header comprises identifiers each indicating the beginning, an intermediate portion or the end of the information in question. The DC header includes identifiers indicating the data length of each item of information held in this ATM cell 10.

Take, for example, the first ATM cell 10 (cell 1) shown in the lower half of FIG. 25. This ATM cell contains the beginning of each of data A through data C, while data D is not stored. Thus the DB header contains an identifier (e.g., "01") indicating the beginning of each of data A through data C, and includes another identifier (e.g., "00") indicating the absence of data D (see FIG. 29, to be discussed later). The DC header stores the data length of each of the different data (A1, B1, C1; see FIG. 30, to be discussed later).

On the receiving side, the DB and DC headers are read out of the payload control information part 23. The information contained in the headers allows the receiving-side ATM transmission apparatus to recognize what kinds of information are held and how they are allocated in the payload user information part 11 of the ATM cell 10 in question. With the necessary information thus revealed, the original data A through D are restored precisely. FIG. 27 describes how the ATM cells multiplexed by the fifth embodiment as shown in the lower half of FIG. 25 are restored back to the original data (data A through D).

In the ATM cell format shown in FIG. 28, what characterizes the fifth embodiment is that, as mentioned above, the payload user information part 11 is headed by the payload control information part 23 which comprises the first control area 34 and second control area 35. The first and the second control areas 34 and 35 accommodate the DB header and DC header, respectively, as identifiers. The DB header may store up to four identifiers, two bits in length each. The meanings of these identifiers (DCF's) are listed in FIG. 29.

In FIG. 29, a bit string "00" held in a DCF means that no data is stored in the corresponding payload user information part 11, a bit string "01" means that the beginning of transmitted data is stored, a bit string "10" means that an intermediate portion of the transmitted data is stored, and a bit string "11" means that the end of the transmitted data is stored.

The DC header may contain up to four pairs of identifiers, each pair indicating a data length (DL) and a data sequence (DSN, or data sequence number). The DL identifier denotes the length of the corresponding data accommodated in the payload user information part 11 (to be described below), and the DSN identifier designates the data sequence number of the applicable data as counted from the first data.

Figures 30, 31:
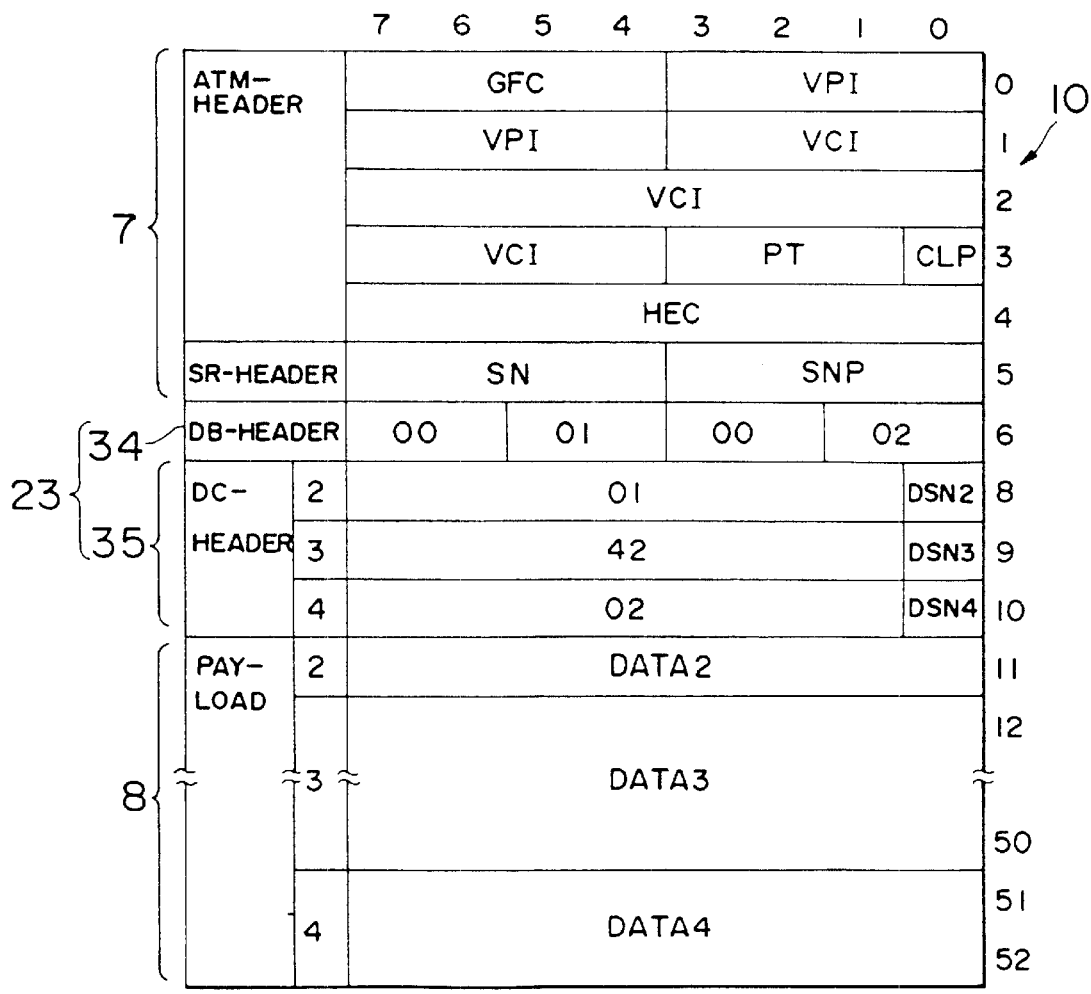
FIG. 30 is a view depicting typical contents of a DC header stored in a payload control information part in connection with the fifth embodiment.
FIG. 31 is a view showing the format of an ATM cell that actually contains information in connection with the fifth embodiment.

The payload user information part 11 ranges from the eleventh octet to the fifty-second octet. Actual data are allocated in this part according to the ratio determined for the respective data. FIG. 31 shows the format of an ATM cell that contains actual data in connection with the fifth embodiment.

As described and according to the fifth embodiment, numerous kinds of data are multiplexed in each ATM cell 10 in which the payload 8 is apportioned in variable lengths. This feature boosts the efficiency of data transmission and makes effective use of the available traffic capacity thanks to the high concentration of transmitted data.

Because there is no need to classify data types on a network 27 (in FIG. 21), the structure of the network can be simplified.

With no need to change transmission and reception protocols on any terminal (TE) for each different type of data to be transmitted in an in-house setup, the terminal may be made smaller in size and simpler in structure than before.

Since it is not necessary to repeat call settings for each set of data to be transmitted, the call setting procedure becomes more efficient. As a result, transmission costs are reduced.

The ease of keeping synchronism between a plurality of kinds of data for simultaneous transmission contributes to preventing the voice or image drop-out during multimedia information transmission.

As many apparently different embodiments of this invention may be made without departing from the spirit and scope thereof, it is to be understood that the invention is not limited to the specific embodiments thereof except as defined in the appended claims.

What is claimed is:

1. An apparatus comprising:
   a plurality of converters, each converter outputting an ATM cell including communication information of a channel in a part of a payload;
   a path identifier detecting unit detecting ATM cells, having the same path information, from ATM cells which have been sent from the plurality of converters;
   a mapping unit mapping the communication information, information indicative of lengths of the communication information and channel identification information of the communication information of from the path identifier detecting unit into a payload of a new ATM cell; and
   an output unit outputting the new ATM cell.

2. The apparatus according to claim 1, wherein the channel identification information of the communication information of each of the detected ATM cells is a value of a virtual channel identifier.

3. The apparatus according to claim 1, further comprising a timer measuring a period of time, wherein the output unit transmits the new ATM cell when the timer has measured the period of time.

4. The apparatus according to claim 1, wherein the output unit outputs the new ATM cell when the payload of the new ATM cell has been filled to capacity.

5. The apparatus according to claim 1, further comprising:
   a management unit for managing a corresponding relationship between a value of a virtual channel identifier and channel identification information; wherein
   the mapping unit converts values of virtual channel identifiers of the detected ATM cells into channel identification information respectively by referencing to the management unit, and maps the communication information, information indicative of lengths of the communication information and channel identification information converted from values of virtual channel identifiers of the communication information of the detected ATM cells from the path identifier detecting unit into a payload of a new ATM cell.

6. A multiplexing device in a system having a plurality of converters, each converter outputting an ATM cell including communication information of a channel in part of a payload, the multiplexing device comprising:
   a path identifier detecting unit that detects ATM cells, having the same path information, from ATM cells which have been sent from the plurality of converters;
   a mapping unit that maps the communication information, information indicative of lengths of the communication information and channel identification information of the communication information of the detected ATM cells from the path identifier detecting unit into a payload of a new ATM cell; and
   an output unit that outputs the new ATM cell.

7. The multiplexing device according to claim 6, wherein the channel identification information of the communication information of each of the detected ATM cells is a value of a virtual channel identifier.

8. The multiplexing device according to claim 6, further comprising: a timer measuring a period of time, wherein the output unit transmits the new ATM cell when the timer has measured the period of time.

9. The multiplexing device according to claim 6, wherein the output unit outputs the new ATM cell when the payload of the new ATM cell has been filled to capacity.

10. The multiplexing device according to claim 6, further the mapping unit converts values of virtual channel identifiers of the detected ATM cells into channel identification information respectively by referencing to the management unit, and maps the communication information, information indicative of lengths of the communication information and channel identification information converted from values of virtual channel identifiers of the communication information of the detected ATM cells from the path identifier detecting unit into a payload of a new ATM cell.

11. A multiplexing method comprising the steps of:
   outputting, by each of a plurality of converters, communication information of a channel, into a part of a payload of an ATM cell;
   detecting, by a path identifier detecting unit, ATM cells including the same path information, from ATM cells which have been sent from the plurality of converters;
   mapping the communication information, information indicative of lengths of the communication information and channel identification information of the communication information of each of the detected ATM cells including the same path information, received from the path identifier detecting unit into a payload of a new ATM cell; and outputting the new ATM cell.

12. The method according to claim 11, wherein the channel identification information of the communication information of each of the detected ATM cells is a value of a virtual channel identifier.

13. A method for multiplexing ATM cells in a system having a plurality of converters, each outputting communication information of a channel into a part of a payload of an ATM cell, the method comprising the steps of:

detecting, by a path identifier detecting unit, ATM cells including the same path information, from ATM cells which have been sent from the plurality of converters;

mapping the communication information, information indicative of lengths of the communication information and channel identification information of the communication information of the detected ATM cells from the path identifier detecting unit into a payload of a new ATM cell; and outputting the new ATM cell.

14. The method according to claim 13, wherein the channel identification information of the communication information of each of the detected ATM cells is a value of a virtual channel identifier.

* * * * *

UNITED STATES PATENT AND TRADEMARK OFFICE
CERTIFICATE OF CORRECTION

PATENT NO. : 6,661,796 B1 Page 1 of 1
DATED : December 9, 2003
INVENTOR(S) : Tomonobu Takashima et al.

It is certified that error appears in the above-identified patent and that said Letters Patent is hereby corrected as shown below:

Title page,
Item [56], References Cited, FOREIGN PATENT DOCUMENTS, please insert
-- JP 63-197148 8/16/88 --
OTHER PUBLICATIONS, please change "A Study of Multimeda ATM Communication" to -- A Study on Multimedia ATM Communication --

Signed and Sealed this

Twenty-fourth Day of August, 2004

JON W. DUDAS
*Director of the United States Patent and Trademark Office*